US009251528B1

(12) United States Patent
McGhie et al.

(10) Patent No.: US 9,251,528 B1
(45) Date of Patent: *Feb. 2, 2016

(54) CONVERSION OF LOYALTY PROGRAM POINTS TO COMMERCE PARTNER POINTS PER TERMS OF A MUTUAL AGREEMENT

(71) Applicants: Sean I. McGhie, Boca Raton, FL (US); Brian K. Buchheit, Davie, FL (US)

(72) Inventors: Sean I. McGhie, Boca Raton, FL (US); Brian K. Buchheit, Davie, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 14/612,863

(22) Filed: Feb. 3, 2015

Related U.S. Application Data

(63) Continuation of application No. 14/314,178, filed on Jun. 25, 2014, now Pat. No. 8,944,320, and a continuation of application No. 14/314,196, filed on Jun. 25, 2014, now Pat. No. 8,973,821, and a continuation of application No. 14/314,297, filed on Jun. 25, 2014, now Pat. No. 8,950,669.

(51) Int. Cl.
*G06K 5/00* (2006.01)
*G06Q 30/02* (2012.01)

(52) U.S. Cl.
CPC .................... *G06Q 30/0227* (2013.01)

(58) Field of Classification Search
CPC ......... G06Q 30/00; G06Q 40/00; G06K 5/00; G06K 19/06; G07D 11/00; A63F 9/24; A63F 13/00; G06F 17/00; G06F 19/00
USPC ................ 235/380, 375, 379, 487, 486, 382; 705/14, 17, 14.32, 14.33, 39; 463/25, 463/20, 13

See application file for complete search history.

(56) References Cited

U.S. PATENT DOCUMENTS

2013/0332388 A1* 12/2013 Martell et al. .............. 705/36 R

* cited by examiner

*Primary Examiner* — Edwyn Labaze
(74) *Attorney, Agent, or Firm* — Patents on Demand P.A.; Brian K. Buchheit; Scott M. Garrett

(57) ABSTRACT

A computer converts a first quantity of loyalty program points of a loyalty program possessed by a member held in a first account to a second quantity of different loyalty program points possessed by the member held in a second account in accordance with a fixed ratio. The loyalty program points and the different loyalty program points are non-fungible, non-negotiable units of exchange. A mutual agreement exists between program operators to permit the conversion. Responsive to the converting: the first quantity of loyalty program points is subtracted from the first account; the second quantity of different loyalty program points is added to the second account; and the entity compensates the commerce partner in accordance with mutual agreement.

20 Claims, 16 Drawing Sheets

1400

Game of Chance 1450 (e.g., Game A)

Interface 1451

☑ Cash in on my Achievement  1452    Convert  1454

Game of Chance 1460 (e.g., Game B)

Interface 1461

☑ Game A
Achievement Points: 10         1462

Receive conversion as:
● Game B: 20 Silver Pieces    1464

1466
Cancel    Receive Funds

Loyalty Program for Business 1

Loyalty Program for Business 1

Loyalty Program for Business 2

CONVERSION OF LOYALTY PROGRAM POINTS TO COMMERCE PARTNER POINTS PER TERMS OF A MUTUAL AGREEMENT

CROSS-REFERENCE TO RELATED APPLICATIONS

This is a continuation application of U.S. application Ser. No. 14/314,178 (filed Jun. 25, 2014); U.S. application Ser. No. 14/314,196 (Filed Jun. 25, 2014); and U.S. application Ser. No. 14/314,297 (Filed Jun. 25, 2014).

The above applications claim the benefit of U.S. Pat. No. 7,703,673 (Filed May 25, 2006); U.S. Pat. No. 8,123,127 (Filed Mar. 10, 2010); U.S. Pat. No. 8,162,209 (Filed Apr. 13, 2010); U.S. Pat. No. 8,181,863 (Filed Jan. 26, 2012); U.S. Pat. No. 8,181,864 (Filed Jan. 26, 2012); U.S. Pat. No. 8,186,583 (Filed Jan. 26, 2012); U.S. Pat. No. 8,201,734 (Filed Mar. 23, 2012); U.S. Pat. No. 8,245,925 (Filed Apr. 6, 2012); U.S. Pat. No. 8,267,315 (Filed May 24, 2012); U.S. Pat. No. 8,297,502 (Filed Jun. 25, 2012); U.S. Pat. No. 8,313,023 (Filed Jun. 25, 2012); U.S. Pat. No. 8,342,399 (Filed Jul. 5, 2012); U.S. Pat. No. 8,376,224 (Filed Jun. 24, 2011); U.S. Pat. No. 8,511,550 (Filed Apr. 16, 2013); U.S. Pat. No. 8,523,063 (Filed Apr. 16, 2013); U.S. Pat. No. 8,523,064 (Filed May 21, 2013); U.S. Pat. No. 8,540,152 (Filed May 23, 2013); U.S. Pat. No. 8,668,146 (Filed Nov. 20, 2012); and U.S. Pat. No. 8,684,265 (Filed Nov. 20, 2012), which claim benefit to Provisional Application 61/358,650 (Filed Jun. 25, 2010); Provisional Application 61/595,263 (Filed Feb. 6, 2012); Provisional Application 61/595,351 (Filed Feb. 6, 2012); and Provisional Application 61/595,429 (Filed Feb. 6, 2012); U.S. application Ser. No. 13/969,936 (filed Aug. 19, 2013); U.S. application Ser. No. 13/969,896 (Filed Aug. 19, 2013); U.S. application Ser. No. 13/969,873 (Filed Aug. 19, 2013); U.S. application Ser. No. 14/034,492 (Filed Sep. 23, 2013); U.S. application Ser. No. 14/024,921 (Filed Sep. 12, 2013); and U.S. application Ser. No. 14/024,936 (Filed Sep. 12, 2013); U.S. application Ser. No. 14/611,764 (Filed Feb. 2, 2015).

The entire contents of each and every one of the above utility and provisional applications and patents are incorporated by reference herein in their entirety.

BACKGROUND

The present invention relates to the field of Automated Teller Machines and, more particularly, to loyalty point conversions, and more specifically to conversion of loyalty program points to commerce partner points per terms of a mutual agreement.

Merchants have used loyalty rewards programs for many years to create and maintain customer loyalty and increase the perceived value of their goods and services. However, the perceived value of the loyalty program rewards points is diminished by the limited redemption options available to the loyalty program member that the reward points granting entity provide.

Loyalty point exchange systems emerged that allow members of different loyalty programs to exchange rewards points in one loyalty program for loyalty points in another. The exchange systems did not operate loyalty points programs of their own, but acted as proxies for a number of third party loyalty program operators. In these exchange systems, no loyalty program operator had any agreement with any other loyalty program operator. Instead, each loyalty program operator unilaterally established a "buy rate" and "sell rate," which the exchange system relied upon. POINTS.COM is an example of such an exchange system that necessarily suffers from a low conversion rate and a continuous loss of value, as each transaction is an open market transaction. Open market transactions impede an ability of a loyalty program operator to shape future consumer behavior, which is a value of running the loyalty program achieved by the loyalty program operator. In other words, open market transactions turn otherwise negotiable units of value (loyalty points) into a fungible unit of value, thereby circumventing loyalty operator established restrictions, conditions, and constraints intentionally implemented for member behavior shaping purposes. Traditionally, exchange centers (like POINTS.COM) have not recognized pitfalls of turning non-negotiable units of value (loyalty points) into fungible units of exchange, which is addressed herein in a novel manner.

That is, conventional exchange systems had certain drawbacks inherent in their implementations that are consistent with blindspots present in conventional teachings specific to loyalty points and their transferability. In conventional exchange systems, customer loyalty to a particular merchant was reduced, loyalty program operator's ability to channel customer behavior was diminished, and the centralized loyalty point conversion systems added a middleman charge to every transaction. The inventors of the present disclosure and related patents of the same family realized that by limiting the points conversions by agreement to complementary businesses such as hotels, airlines, and rental car agencies, the agreed parties could offer their loyalty program members the benefits of increased redemption options while still getting the benefit of creating and maintaining customer loyalty that the loyalty programs were intended to provide. Furthermore, customer behavior could be channeled to the benefit of each of the commerce partners who were parties to the agreement, and cross promotions and other marketing programs could enhance each partners business with no detriment to their complementary business partners. Thus, advantages of a specific consumer partner relationship and member exposure to this relationship serves to balance negatives resulting from increased fungibility of loyalty program points, from a program operator perspective.

The value of the synergy created by these agreed loyalty point conversion arrangements was not apparent to loyalty program operators at the time of the filing of the parent patent in the present patent family on May 25, 2006, as evidenced by the lack of any such systems at that time. Today, however, almost all sole source loyalty program operators (operators having strong loyalty program barriers that expressly impose restrictions, conditions, and constraints that limit fungibility of granted loyalty points) in the airline, hotel, rental car agency, credit card, and other industries operate under these kind of mutually beneficial points conversion agreements.

Another attempted solution to granting consumers increased redemption options is to aggregate large sets of retailers into a single rewards program. These aggregated programs, sometimes referred to as networked loyalty programs, have disadvantages in that participating retailers surrender control to a centralized, aggregate program. In these programs, many merchants distribute points originated by the networked program operator that secures or backs the points (thus guaranteeing the value). Within the network loyalty program, network points are fungible across point distributing merchants. In these networked loyalty programs, however, merchants are restricted from shaping behavior of customer to an extent possible with sole source program since incentives present for the program operator (the networked loyalty program operator) are based on increasing merchant and consumer participation to create a "natural monopoly" that reinforces and incentives participants to join the networked program (which the networked loyalty program operator receives fees or profit on a per-transaction basis, justifying the operating costs from the program operator perspective). Thus, merchants do not have their own "program" but are participants in the networked program, which inherently imposes operating constraints on the merchant distributers—as there is a tension between merchant desires/incentives and those of the networked loyalty program operator. In other words, merchants have a hard time restricting redemption options to those minimizing merchant costs and have a challenge shaping consumer behavior using restrictions, conditions, and other constraints (such as redemption constraints, expiration dates that provide point pressure on members, and member-ship requirements specific to the merchant as other merchants are point distributing participants by nature of a networked program) that are inherently/implicitly present in a well-balanced independent loyalty program (such as those typically operated by airlines and hotels). For example, if competitors are permitted to join in the aggregate program (as merchant point distributers), customers of the aggregate program have options within the program for competing goods and services. Loyalty to a specific retailer is compromised.

In the present disclosure, the loyalty points are "non-negotiable" because of the restrictions imposed by the points granting entity become, as a result of the conversion, funds that are independent of the granting entity and its restrictions.

DETAILED DESCRIPTION

Loyalty programs are structured marketing efforts that reward loyalty and attempt to affect future consumer behavior. This behavior is altered by providing loyalty points to members of the loyalty program, which are subject to the terms and conditions imposed by the loyalty program operator. Members can earn and spend the points as guided by the program operator, and per the restrictions imposed on the program. Effectively, loyalty points are the "carrot" that guides consumer behavior. Restrictions and conditions (imposed by loyalty program operators after the members have earned points) are the "stick" that helps mold or shape the consumer behavior.

Figure 16A:
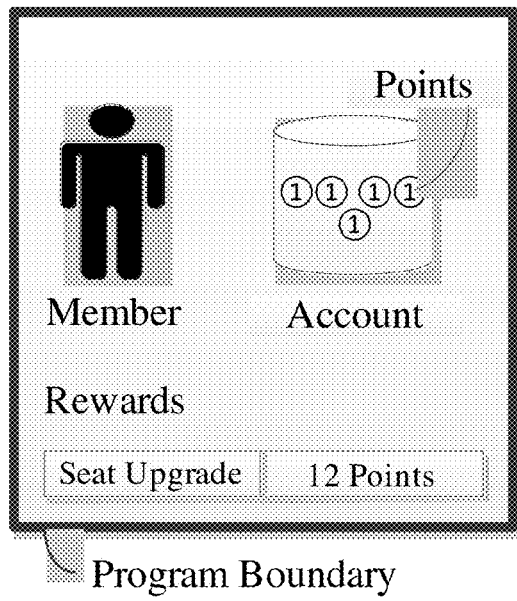
FIG. 16a is a flowchart illustrating a loyalty program for a business.

A simplistic depiction of a loyalty program illustrated in FIG. 16A shows that the most basic elements are that loyalty programs require memberships, where members can earn points in that member's account. The points can be used to purchase rewards offered by the loyalty program.

Consumer behavior is shaped since a member may have an upcoming flight (in an airline loyalty program) and choose an airline that he is a member of, if he/she receives a free seat upgrade for that flight, even if the competing airline is cheaper as a default, since paying for an upgraded ticket would be more expensive in absence of the upgrade earned through point accumulation. Thus, loyalty is rewarded, and the business running the program receives a benefit of increased patronage. If a member does not meet membership criteria (established by the loyalty program operator and subject to change even after points are earned), previously earned points can expire and/or be lost entirely.

Successful loyalty programs receive more business on average from their loyalty program members than from non-members. Consumer behavior is shaped by the programs conditions and restrictions (like requiring a certain number of points within a time period to receive a reward). To shape behavior using the "structured marketing effort" that is a traditional loyalty program, the earned points must be non-negotiable and the program operator must maintain a level of control—else the shaping of consumer behavior is sacrificed and the purpose of a traditional loyalty program is not served.

Figure 16B:
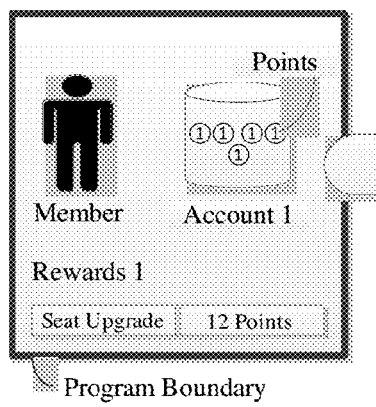
FIG. 16b is a flowchart illustrating two loyalty programs for two different business that are connected by a "bridge".
Figure 16B:
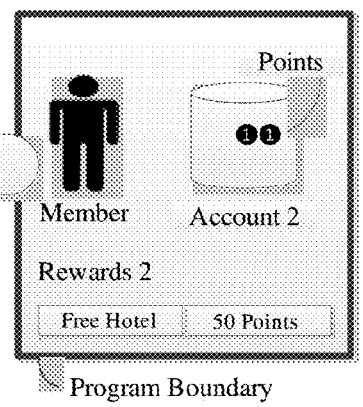

With the above as context, embodiments of the present disclosure include material limitations to create a bridge between two different loyalty programs, as illustrated by FIG. 16B, each with their own program specific boundaries.

By default, there is no bridge between different loyalty programs. That is, a person can belong to multiple different loyalty programs but cannot spend points earned from a first loyalty program for rewards provided by a second loyalty program due to hard program boundaries. As noted above, these program boundaries are non-trivial as they exist and are required to ensure that the loyalty programs can serve their intended function of shaping consumer behavior. If points were freely transferable and made into negotiable funds (like a baseline currency) the loyalty program loses all consumer behavior shaping effects. That is, if earned points were "cash" currency, the flyer of the earlier example, would "cash out" their points and fly with Airline 2 (instead of Airline 1) if airline 2 (in absence of the loyalty reward incentive) offered a better cash deal for a given transaction. The persuasive force of rewards to ensure loyalty requires the existence of a program boundary, which favors patronage of a loyalty program operator's services over those of competitors.

This persuasive force present in the example above (and a traditional loyalty program having a strong program boundary across which non-negotiable credits are not able to easily cross) is a direct result of conditions imposed upon already granted points, which lock the redemption of these loyalty points into services provided by a specific vender. The loyalty point operators do not want points to be negotiable or to be fungible across the program boundaries—else their function as a persuasive force for guiding/shaping future member behavior diminishes substantially.

Another significant point with traditional loyalty programs is there is an inherent tension between customer desires and those of the loyalty program operator (e.g., the business providing the program). The customer wants to minimize costs paid by the customer and to maximize the benefit received for that cost. The business wants to maximize profit, which includes minimizing costs. Providing additional benefits to a customer, however, generally increases the cost to the business. Minimizing costs paid by the customer lowers the businesses profits. Ideally, the business desires to provide something of perceived customer value, which has a minimal cost to the business. This would cause that business's services/goods to be preferred over those of a competitor without increasing the cost to the business. Loyalty programs are a vehicle used by many businesses to achieve these ends. Airlines, for example, have excess capacity (empty seats) in many of their flights some of which are premium seating. It costs the airlines nothing additional (or negligibly different) to place a person in an otherwise unused seat. Airlines, however, do not want otherwise paying customers to fill the "vacant seat" since this lowers the Airlines profits (an otherwise paying customer is converted to a non-paying one in such a situation and the airlines profit for that flight is decreased by the cost of one seat). Airline loyalty programs typically implement blackout dates to match this business specific reality around times when expected excess capacity is low (so that loyalty points cannot be used for these flights). Airlines increase the "pressure" on program members by having points expire over time and/or by requiring moderately high thresholds before points can be expended. Expiring points and usage thresholds accomplish multiple goals of the Airlines. The first is to encourage additional usages of the program to earn sufficient points (before point expiration) to earn a customer desired reward. Additional usages (that earns points) results in increased sales/profits for the airlines. Another goal is to restrict the usage data to "burn" points on flights that the consumer may not otherwise take. Without black-out usage dates and expiration restrictions a member would most likely "hold" points to spend them on a flight they would otherwise have to pay for. The airlines prefer to permit an additional flight that would not otherwise occur (thus no profit is given up) using excess capacity (thus negligible costs are incurred from the airline perspective). Yet another advantage of setting expiration dates is breakage of points. Breakage of points is an intentional feature of many loyalty programs. By breakage, a set of previously awarded loyalty points disappear if not redeemed with a fixed time period. This is highly advantageous to loyalty program operators since they provided a customer perceived benefit (points at the time of use) without incurring a cost (zero cost for redemption of these points since they expired). So between breakage and point pressure a statistical cost of providing points as a customer incentive is significantly decreased (the airline incurs no or minimal cost for you taking an extra "trip" in an otherwise unused seat and incurs no cost for points that expire). Airlines balance the costs of administrating a loyalty program plus the costs of implementing the program (redemption costs) against the benefits (additional profit through customer behavior shaping) received from the program. Restrictions and conditions imposed on a program, membership requirements, restrictions on fungibility of points, the non-negotiable nature of loyalty points, and other factors are all intentionally balanced in context of a specific business when implementing a viable loyalty program.

Stated differently, many "advantages" from a consumer standpoint are disadvantages from a program operator standpoint—by design. For example, as noted above expiration dates on points provide for breakage and point pressure—which are advantageous from a program operator perspective, but are not preferred by customers. Stating that it would be advantageous to remove these intentionally imposed restrictions since customers would be happier is true from a customer perspective, but not true from a loyalty operator one. One of ordinary skill implementing loyalty points would not disregard an intentionally imposed feature (expiration date, which results in lock in and point pressure to decrease operator costs) in absence of a benefit greater than the additional costs incurred by removing these restrictions. In other words, simple statements like "one of ordinary skill would modify an airline program to remove restrictions because customers would like this" are demonstrably false statements of motivation, in that such a statement ignores fundamental and intentionally implemented features of a loyalty program. If black-out dates were not an advantage to the loyalty operator—they would not be implemented in the first place. The loyalty program operator knows that the blackout dates are not preferred by customers, nor are expiration dates on points. This is part of the tension between customers and loyalty program operators, which is an essential feature to successful traditional loyalty programs. In traditional loyalty programs with intentional features as detailed above, the non-negotiable nature of loyalty points is critical. Loyalty points of many programs are intentionally not transferable between members or across program boundaries, since transferring points in such a manner can circumvent restrictions and conditions (like expiration dates). A customer may desire to avoid these imposed restrictions (which help shape the customer behavior in a manner intended by the program operator while lowering program costs), but one of ordinary skill in loyalty programs knowing and understanding the essential purpose of the restrictions and the resulting requirements of non-negotiability and strong program boundaries would not find such a change obvious. Such statements are analogous to a statement that blocking a fuel line of an automobile is advantageous as it will decrease fuel consumption of that vehicle and provide environmental benefits from burning less fuel. Strictly speaking, the above statement is true, but the purpose of an automobile is to permit travel and the modification (blocking fuel) cases the reference to be unsuitable for its intended purpose. One cannot take the "fuel conserving" benefits of blocking a fuel line and combine them with the transportation benefits of an automobile—as these two features are in tension with each other. Similarly, one cannot remove or modify essential features of a loyalty program (relied upon to allow the references to operate as intended) and change them to add another (but conflicting) feature that is in tension with the first teaching. This is attempted (improperly) throughout the petition, as will be explained herein, and is improper. One of ordinary skill recognizes that non-negotiability of points is an essential feature of many loyalty programs, which is linked to restrictions and conditions. You cannot remove or change these essential features without changing the nature and operating principles of the underlying loyalty program.

Two different types of loyalty programs include sole source programs and networked programs. Sole source programs are operated and run by a single business and by default have strong program boundaries. Networked programs have many different participant business (analogous to a storefront being a mall verses a single merchant store) who give the same points which are generally redeemable to any member of the network. Sole source programs are generally non-fungible, non-negotiable, and have strong program boundaries, as detailed above. Networked programs generally have fungible points with minimal restrictions and non-existent or weak boundaries at least between network participants.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
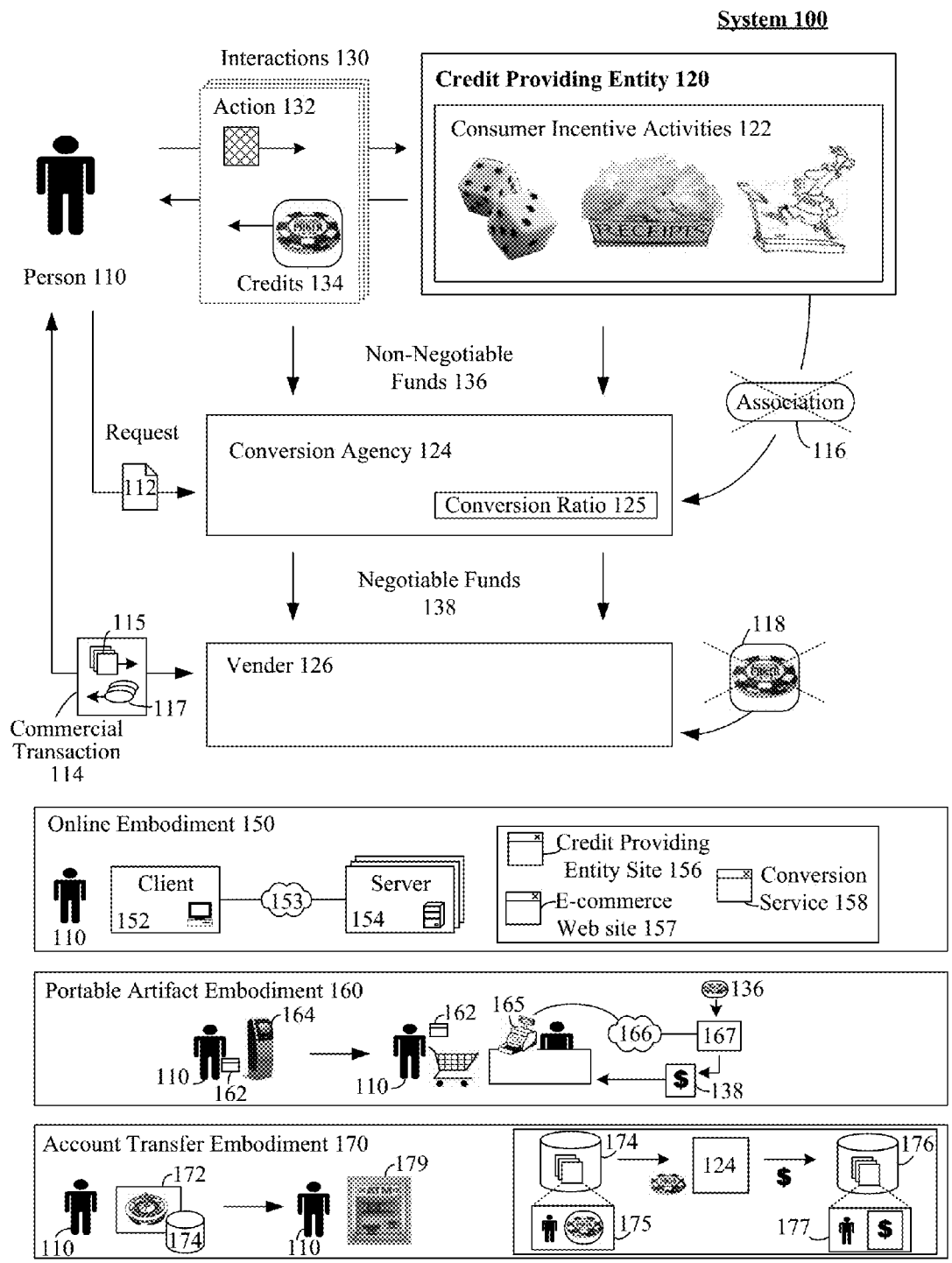
FIG. 1 is a diagram of a system in which non-negotiable funds earned through a variety of actions or anticipated future actions are converted into negotiable funds in accordance with an embodiment of the inventive arrangements disclosed herein.

FIG. 1 is a diagram of a system 100 in which non-negotiable funds 136 earned from consumer incentive activities 122 are converted into negotiable funds and/or entity independent funds 138 in accordance with an embodiment of the inventive arrangements disclosed herein. In one embodiment, multiple interactions 130 can occur between a person 110 and a credit providing entity 120, in which the person 110 participates in consumer incentive activities 122. During each interaction 130, an action or behavior 132 can be taken. With each successful completion of the consumer incentive activity 122, person 110 can receive credits 134 in the form of non-negotiable funds 136. In one interaction 130, action 132 can be a wager of a game of chance. In this instance, with each non-successful outcome of the game of chance, the person 110 can lose their wager 132.

Other actions 132 for earning credits 134 through interactions 130 with a credit providing entity 120 are contemplated. Such actions can, for example, result in the person 110 earning participation credits, achievement credits, sponsored initiative credits, social networking credits, or even advanced credits in a loan. All of these credits can be earned for a targeted purpose or goal set by the user him or herself or another entity such as a government or corporate entity (e.g., as a sponsored initiative such as a green initiative or a market promotion).

As mentioned, the types of credits 134 are non-negotiable funds 136. These funds 136 (e.g., credits 134) may not be redeemable on an open market. For example, vender 126 will not accept 118 the credits 134 for commercial transactions 114. A conversion agency 124, which is not directly associated 116 with the credit providing entity 120 can convert the non-negotiable funds 136 (which can be a quantity of credits 134) into negotiable funds and/or entity independent funds 138. This conversion can occur in response to a request 112 by person 110.

Person 110 can conduct a commercial transaction 114 with vender 126. During the transaction 114, the person 110 can specify a user-selected set of requests 115 for goods and/or services 117 of the vender 126. The goods and/or services 117 can cost a quantity of negotiable funds and/or entity independent funds 138, which are provided to the vender 126. In one embodiment, the negotiable funds and/or entity independent funds 138 can be provided directly to the vender 126 by the conversion agency 124. In another, the negotiable funds and/or entity independent funds 138 can be provided by the conversion agency 124 to person 110, who provides these funds 138 to the vender 126.

Numerous embodiments exist for conducting the conversions as described herein, a few of which are shown as embodiments 150, 160, and 170. Embodiment 150 shows an online embodiment, where a person 110 can interact (130) with a credit providing entity site 156 to participate in a consumer incentive activity 122. The commercial transactions 114 can be conducted via an e-commerce Web site 157. Additionally, the conversion agency 124 can implement a software based conversion service 158, which performs the conversion of the non-negotiable funds 136 into the negotiable funds and/or entity independent funds 138. The Web sites 156, 157 and service 158 can run within one or more servers 154. These servers 154 can be connected to a client 152 via a network 153, where the client 152 is a computing device that user 110 interacts (130 and/or 114) with.

In one configuration of embodiment 150, the conversion service 158 can be linked to a payment option present in the E-commerce Web site 157, which operates in a manner similar to PAYPAL, GOOGLE CHECKOUT, and the like. That is, a payment option can be presented that permits goods/services of vender 126 to be purchased using (at least in part) funds 138 converted from credits 134, which were earned from the consumer incentive activities 122.

Embodiment 160 shows a portable artifact embodiment, where a person 110 stores entertainment credits 134 from the game of chance 122 upon a portable artifact 162, which can be a physical card with a magnetic strip, a RFID storage device, a flash memory card, or other tangible artifact able to store digitally encoded (or even analog encoded) data. Machines 164 upon which consumer incentive activities 122 are performed or recorded can include a reader/writer able to alter content stored on the portable artifact 162. Thus, actions 132 outcomes in credits 134 value can be recorded on the artifact 162. The person 110 can thereafter shop at a storefront of vender 126 and present a cashier 164 with the artifact 162. A cash register 165 used by the cashier 164 can be connected to a network 166. The conversion agency 124 can have a network element 168 connected to the network 166, which converts non-negotiable funds 136 on the artifact 162 into a quantity of negotiable funds and/or entity independent funds 138 needed to complete the commercial transaction 114 conducted via the register 165 and cashier 164. From the perspective of the vender 126, the transaction 114 conducted via the register 165 is a "standard" transaction that results in the vender 126 receiving suitable negotiable funds and/or entity independent funds 138 for providing the goods/services 117 to person 110.

Embodiment 170 shows an account transfer embodiment 170, where a person 110 participates in a consumer incentive activity 122 (e.g., in this instance a game of chance 172). Earnings (134, 136) from the consumer incentive activity 122 are recorded within a tangible data store 174 associated with the credit providing entity 120. This data store 174 can include an account 175 for the person 110, which tracks an amount of credits 134, which are non-negotiable funds 136, of the person 110. Conversion agency 124 can directly access the account 175 of data store 174 and can convert a quantity of credits 134 into negotiable funds and/or entity independent funds 138, which are recorded in a tangible data store 176 that is not directly associated with entity 120. The data store 176 can include an account 177 for the person 110, which contains an amount of negotiable funds and/or entity independent funds 138, of the person 110. A person 110 can conduct commercial transactions 114 via a machine 179, such as a kiosk, an ATM machine, etc., which involve funds of account 177 changing. In one embodiment, the goods/services 117 received from person 110 in embodiment 170 can include cash (such as from an ATM machine). This cash can be an amount of cash-back received during transaction 114, can be the transaction 114 itself and may involve a transaction fee, which is extracted from account 177 by machine 179.

The embodiments 150-170 are for illustrative purposes only and are not intended to be (or to be construed as being) exhaustive or comprehensive. For example, any combinations of the embodiments 150, 160, 170 are to be considered within scope of the disclosure. Thus, a consumer incentive activity 122 can be conducted via a Web site 156 (per embodiment 150), where a commercial transaction 114 using the converted entertainment credits 134 per agency 124 can be conducted at a storefront, where a cashier 164 interacts (130) with person 110. In another contemplated configuration, the consumer incentive activity 122 can be conducted with a machine 172 that places credits 134 in account 175 (per embodiment 170), which are converted and used to buy goods/services 117 via an e-commerce Web site 157 (per embodiment 150). In another contemplated configuration, credits can be earned via machine 164 and placed on artifact 162 (per embodiment 160), which can be placed in a machine 179, such as an ATM (per embodiment 170) to extract funds 138, which are converted (by agency 124) from the credits 134 stored on artifact 162.

In one embodiment, the conversion agency 124 can be compensated (e.g., charge a processing fee) for converting the non-negotiable funds 136 to negotiable funds and/or entity independent funds 138. This fee can be paid to conversion agency 124 by the game providing entity 120, the person 110, and/or by the vender 126.

As used herein, consumer incentive activities 122 can be in the form of games, contests, or can occur based on certain consumer behavior, actions or purchases. A game can be structured playing, usually undertaken for enjoyment and sometimes used as an educational tool. A contest can be an event in which at least two teams or individuals compete. There may be an award to a winner or awards for multiple top performers, but a contest may be imposed for training. A contest may occur naturally, or be planned by the participants, rather than organized by another party.

Games are distinct from work, which is usually carried out for remuneration, and from art, which is more often an expression of aesthetic or ideological elements. However, the distinction is not clear-cut, and many games are also considered to be work (such as professional players of spectator sports/games) or art (such as jigsaw puzzles or games involving an artistic layout such as Mahjong, solitaire, or some video games). Key components of games can be goals, rules, challenge, and interaction. Games can generally involve mental or physical stimulation, and often both. Many games help develop practical skills, serve as a form of exercise, or otherwise perform an educational, simulational, or psychological role.

Credit providing entities 120 include any entity providing a consumer with credits based on user behavior, actions, achievements, and the like. Credit providing entities 120 can include corporations such as airlines, hotels, credit card companies, casinos, cruise ships, States (for lottery, scratch off games, etc.), churches, race tracks, online gambling site providers, e-commerce sites, slot-machine houses, carnivals, gambling parlors, companies (for promotional sweepstakes), High Schools (for raffles), and the like.

The action 132 can, in one embodiment, risk money, previously earned credits 134 or something of material value on an event with an uncertain outcome with intent on winning additional money, credits 134, and/or material goods/services. An amount of credits 134 earned from an interaction 130 with a credit providing entity 120 can vary in direct proportion to the user action, behavior, achievement, or the like.

Credits 134 are non-negotiable funds 136 that generally have no value outside of an environment (building, Web site, etc.) of the credit providing entity 120. For example, casinos (one embodiment of entity 120) generally utilize casino tokens, chips, or plaques to represent a quantity of entertainment credits 134. Online gambling sites 156 (and electronic gambling devices) often provide an account to a person 110, where entertainment credits 134 are managed within this account in a computer readable storage medium. In another example, hotel and car rental entities oftentimes afford customers loyalty points that can be redeemed only in future transactions with the hotel or car rental entity itself for certain upgrades or discounts (a form of credits 134). In yet another example, a grocery store may offer consumers a store card to receive special group member discounts to be applied at checkout and additional points for purchases made at the store; for instance, every dollar spent can earn the consumer a point and once the consumer achieves 100 credits in a month timeframe the credits can translate into a 10 cent discount per gallon of gas purchased at a participating gas station.

Use of credits 134, such as casino tokens, rewards points or discounts, can be more convenient than use of negotiable funds and/or entity independent funds 138 for many reasons. For example, use of entertainment credits 134 makes theft and counterfeiting more difficult. Entertainment credits (which when having a physical representation are often a uniform size and weight) can be relatively easy to stack, count, etc. Additionally, studies have proven people (110) engage in consumption more freely (e.g., play games of chance with larger wagers and with greater frequency, or more readily purchase goods and services), when credits 134 are used or applied to the purchase, behavior, or activity, rather cash or other negotiable funds and/or entity independent funds.

Additionally, use of credits 134, can have legal benefits that can permit entities 120 to conduct games of chance 122, which would be prohibited if negotiable funds and/or entity independent funds 138 were utilized instead of entertainment credits 134. That is, numerous legal statutes and regulations exist that are more restrictive when consumer incentive activity earnings are in a form of negotiable funds and/or entity independent funds 138. For example, in the instance that consumer incentive activity 122 is gambling, the Unlawful Internet Gambling Enforcement Act (UIGEA) of 2006 prohibits many online gambling activities with negotiable funds and/or entity independent funds 138, which are permitted with certain forms of non-negotiable funds 136. For example, electronic fund transfers via credit cards or debit cards related to gambling winnings are generally prohibited by US banks. Similarly, wire transfers of negotiable funds and/or entity independent funds 138 earned through gambling are legally prohibited in many instances. Many of these acts explicitly prohibit the transfer of negotiable funds from gambling earnings across state lines Non-negotiable funds 136 can include any of a variety of financial instruments that are not legal currency and not governed under article 3 of the Uniform Commercial Code (UCC). For example, non-negotiable funds 136 can include IOUs issued by the credit providing entity 120. In one embodiment, non-negotiable funds 136 can include secured transactions, which take a security interest on collateral owned by the credit providing entity's 120 assets, which are subject to Article 9 of the UCC. In one embodiment, the non-negotiable funds 136 can include letters of credit, issued by the credit providing entity 120.

Negotiable funds 138 comprise a set of negotiable instruments, which are a specialized type of "contract" for the payment of money that is unconditional and capable of transfer by negotiation. As payment of money is promised later, the instrument itself can be used by the holder in due course frequently as money. Common examples include checks, banknotes (paper money), and commercial paper. Thus, negotiable funds 138 include currency, and instruments covered by Article 3 and 4 of the Uniform Commercial Code. For a writing to be a negotiable instrument under Article 3,[1] the following requirements must be met: 1) The promise or order to pay must be unconditional; 2) The payment must be a specific sum of money, although interest may be added to the sum; 3) The payment must be made on demand or at a definite time; 4) The instrument must not require the person promising payment to perform any act other than paying the money specified; 5) The instrument must be payable to bearer or to order. Additionally, negotiable funds include commercial paper, letters of credit (governed by Article 5 of the UCC), Bills of lading (governed by Article 7 of the UCC), securities (governed under Article 8 of the UCC), and deeds and other documents. One important consideration for many negotiable instruments (funds 138) is that they are payable to a bearer on demand.

Entity independent funds 138 can include any funds that are independent of an entity providing the non-negotiable funds 136. For example, the entity independent funds 138 can represent reward points from a company A, where the non-negotiable funds 136 are reward points from a different company B. Additionally, the entity independent funds 138 can represent an in-game or in-marketplace currency (where the non-negotiable funds 136 are not able to be used for direct purchases in-game or in-marketplace).

The commercial transaction 114 can be one in which wherein the quantity of negotiable funds and/or entity independent funds 138 are applied to user (110) specified (via request 115, for example) purchase of a good or service 117. Stated differently, a commercial transaction can be an economic transaction where person 110 receives a good or a service from vender 126 for value. Commercial transactions 114 can include a sale goods (117) from a storefront, a Web site, a catalog (mail order), over the phone, and the like. Transaction 114 can also include a payment for a service requested by person 110. Payment of the negotiable funds and/or entity independent funds 138 during the commercial transaction 114 can occur before, after, or concurrent with the receipt (or shipping) of the goods or service 117. A contract (including specifics established by the parties (110 and 126) as well as legal defaults provided by the UCC or applicable common law/state law) between the vender 126 and person 110 established as part of the commercial transaction 114 can determine when payment (funds 138) for the goods/services 117 is due. In one embodiment, commercial transaction 114 can include transaction where currency is provided to person 110 by a vender 126 (a bank as part of an ATM transaction, for example) for a fee. This currency can be provided as a loan or as a withdrawal from an account of person 110, where the account includes the negotiable funds and/or entity independent funds 138.

The conversion agency 124 can be a legal entity that converts non-negotiable funds 136 (including credits 134) into negotiable funds and/or entity independent funds 138. The conversion agency 124 can lack a direct association 116 with the credit providing entity 120. In one embodiment, no legal relationship of enablement of corporate identity (no parent, subsidiary, etc.) relationship can exist between the conversion agency 124 and entity 120. No fiduciary duties under corporate law can exist between agency 124 and game providing entity 120. In one embodiment, agency 124 can be geographically located outside property owned or leased by the game providing entity 120. In another, it can lease space and provide its services from entity 120 owned/leased land. In one embodiment, the conversion agency 124 can support multiple different credit providing entities 120, which can be competitors of each other.

In one embodiment, the conversion agency 124 is not a bank or similar financial institution (and may therefore be outside the guidelines established by UIGEA and other statues and regulations, which impose restrictions on banks). In one embodiment, the conversion agency 124 may be located in the same jurisdiction as the credit providing entity (possibly to avoid legal entanglements/restrictions with operating in multiple or across jurisdictional boundaries) or may be located in a jurisdiction with favorable rules for performing the fund conversions.

In one embodiment, the conversion agency can be tasked with establishing and maintaining a conversion ratio 125. In another embodiment, it should be noted that the credit providing entity 120 can also predetermine a conversion ratio 125 for credits 134 that will govern the conversion of non-negotiable credits 136 to negotiable funds and/or entity independent funds 138. In either embodiment, the conversion agency 124 will utilize conversion rate 125 in calculations associated with converting non-negotiable funds 136 to negotiable funds and/or entity independent funds 138. The conversion ratio 125 can, in one embodiment act like a conventional exchange rate in that it defines the rate at which one currency (the credits 134) will be exchanged for another (negotiable funds and/or entity independent funds 138). It can also be regarded as the value of one market's currency (credit market) in terms of another currency (real-world negotiable funds market).

In the retail currency exchange market, a different buying rate and selling rate can usually be quoted by money dealers. As referred to herein, the buying rate is the rate at which conversion agencies accept non-negotiable funds 136 for conversion to negotiable funds, and the selling rate can be the rate at which conversion agency 124 or other such entity as well as credit providing entities 120 can advance credits to person 110 for future actions 132. The quoted rates can incorporate an allowance for a conversion agency's margin (or profit) in trading, or else the margin may be recovered in the form of a "commission" or in some other way.

It should be noted that different rates 125 may also be quoted for different types of non-negotiable funds (e.g., casino chips, loyalty rewards point, and the like). In one embodiment, conversion ratio 125 can be a market based exchange rate and thus can change whenever the values of either of the two component currencies change. The market for non-negotiable funds 136 to negotiable funds and/or entity independent funds 138 exchange can be influenced by times of year and special occasions (such as Christmas, the New Year celebrations, Valentine's Day, high travel season, and the like) to affect conversions of certain types of credits 134 based non-negotiable funds 136 to negotiable funds and/or entity independent funds 138. In another embodiment, the conversion ratio 125 can be a fixed exchange rate, also known as a pegged exchange rate, which is a type of exchange rate regime wherein a currency's value is matched to the value of another single currency. The conversion ratio 125 in this instance does not fluctuate but is consistent and steady.

Figure 2:
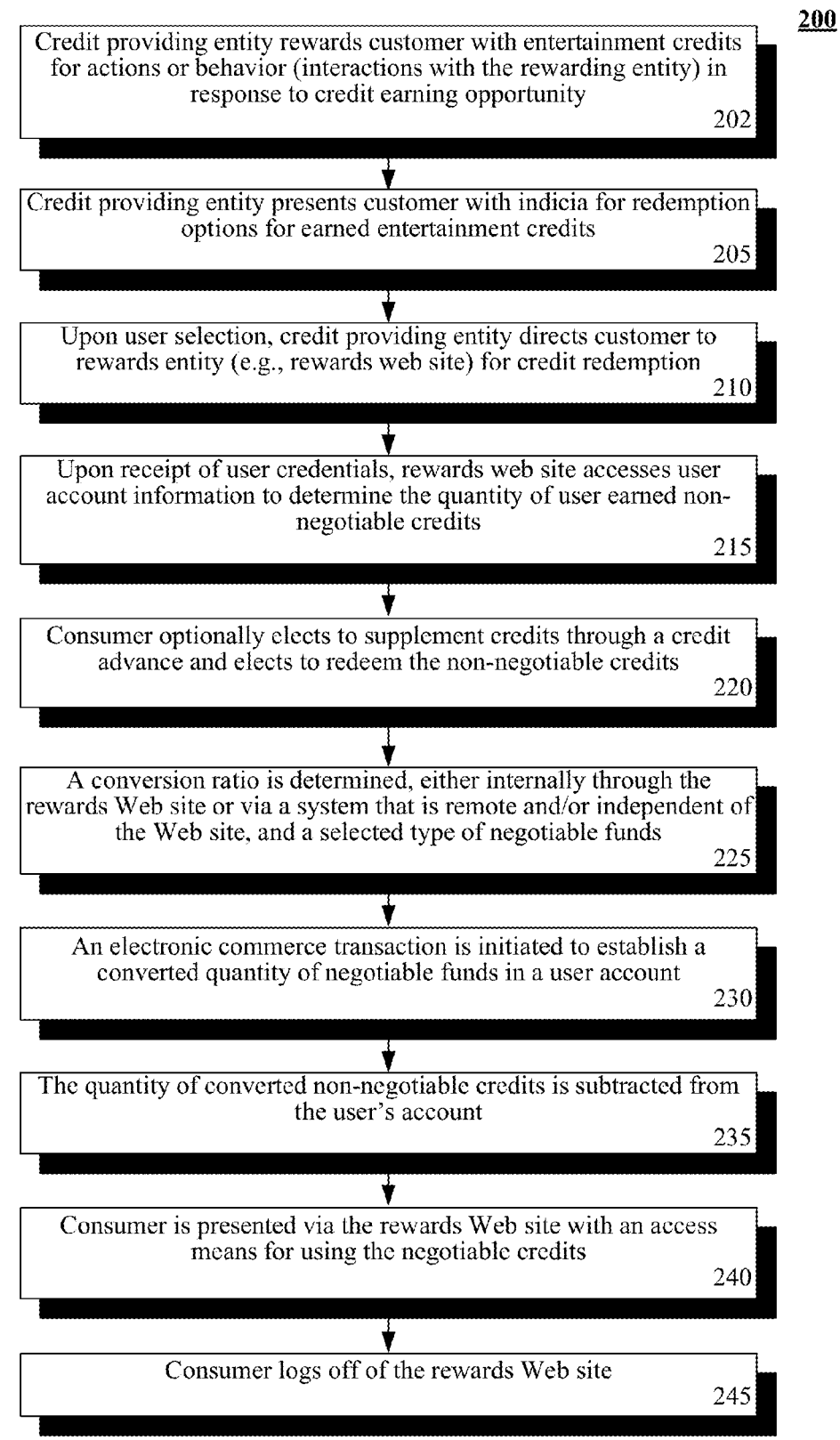
FIG. 2 is a flow chart of a method for the Web based granting and conversion of non-negotiable credits to negotiable funds in accordance with an embodiment of the inventive arrangements disclosed herein.

FIG. 2 is a flow chart of a method 200 for the Web based granting and conversion of non-negotiable credits to negotiable funds and/or entity independent funds in accordance with an embodiment of the inventive arrangements disclosed herein. Method 200 can in one embodiment comprise steps 202 to 245. However, the following description of one embodiment of method 200 is not intended to be construed as limiting as other or additional steps for an entity granting a consumer entertainment credits and presenting indicia leading to credit redemption are contemplated.

Method 200 can begin in step 202, where the credit providing entity can reward a customer with entertainment credits for actions or behavior (or promised future actions or behavior) undertaken by the customer in response to a credit earning opportunity. In step 205, the credit providing entity can present a customer with indicia for redemption options for the customer earned entertainment credits. Indicia can be in the form of banners, radio buttons, pop-up windows, embedded links, audio and or video notification, QR or bar codes, flyers, and the like.

Upon user selection of the indicia advertised redemption option(s), the credit providing entity can in step 210 direct the customer to one or more rewards entities (e.g., a rewards web site) for credit redemption. In step 215, the rewards Web site utilizes user credentials provided by, for example, the credit providing entity of the customer or the customer him or herself to access the consumer's account information and determine the amount of non-negotiable credits in the consumer's account. The consumer optionally selects to supplement his or her available credits by engaging in a credit advance and elects to redeem some quantity of non-negotiable credits in step 220. If supported by the rewards Web site, the consumer can additionally select the form of negotiable funds and/or entity independent funds to convert the non-negotiable credits.

In step 225, a ratio is determined for the conversion of the non-negotiable credits to the selected type of negotiable funds and/or entity independent funds. This ratio can be determined by any of a variety of means including, but not limited to, an algorithm internal to the rewards Web site, an algorithm contained in a system that is remote and/or independent of the rewards Web site, and the like. An electronic commerce transaction is initiated in step 230 to establish the converted amount of negotiable funds and/or entity independent funds in a user account. The quantity of converted non-negotiable credits is subtracted from the user's account in step 235. In step 240, the rewards Web site presents the consumer with an access means for the negotiable funds and/or entity independent funds. Lastly, the consumer terminates the session by logging off the rewards Web site in step 245.

Figure 3:
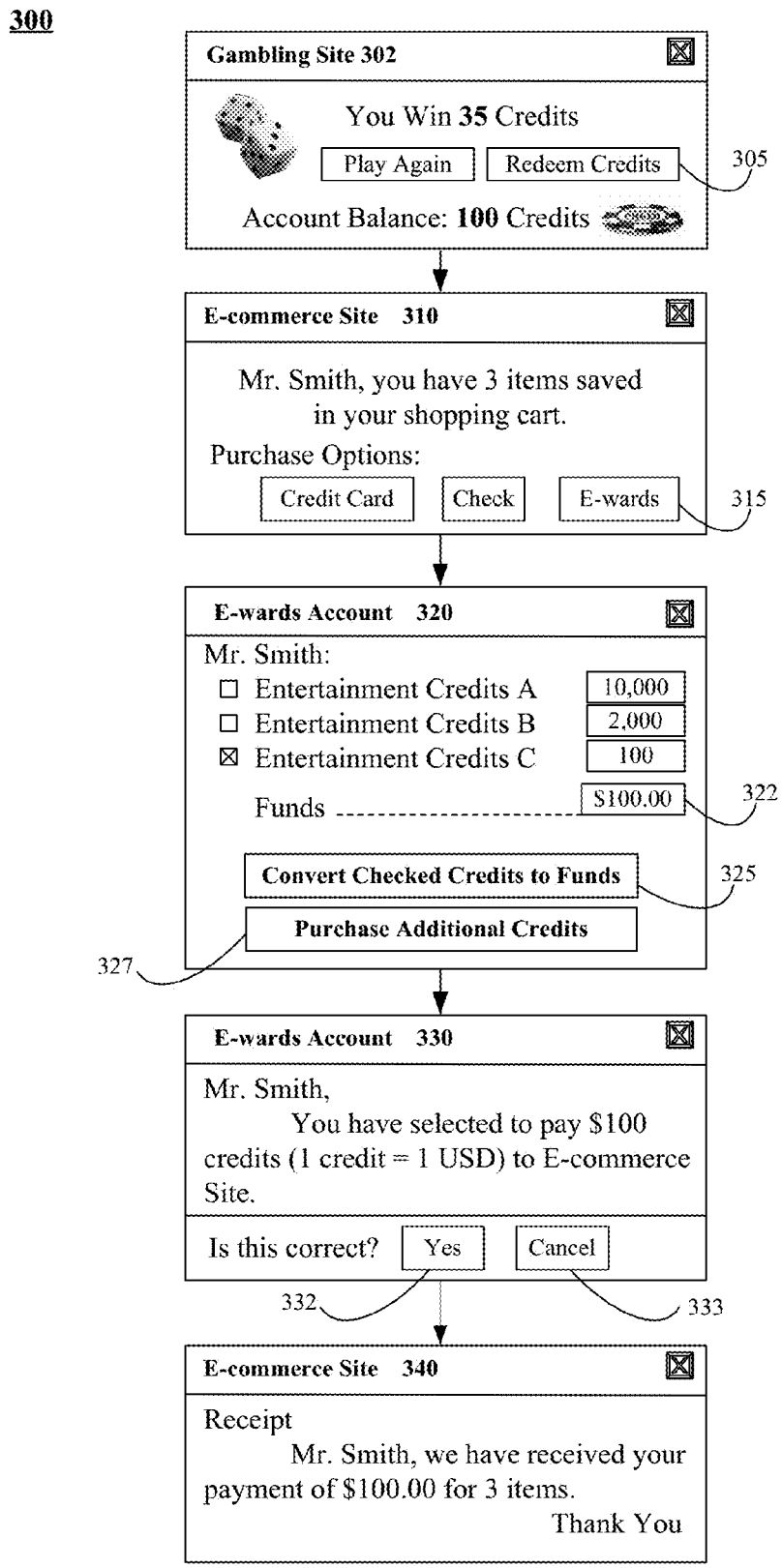
FIG. 3 is a depiction of successive GUIs that illustrate a web based credit granting event with credit redemption indicia and subsequent conversion of non-negotiable funds into negotiable funds in accordance with an embodiment of the inventive arrangements disclosed herein.

FIG. 3 is a depiction 300 of successive GUIs that illustrate a web based credit granting event with credit redemption indicia and subsequent conversion of non-negotiable funds into negotiable funds and/or entity independent funds in accordance with an embodiment of the inventive arrangements disclosed herein.

GUI 302 shows an interface from a gambling Web site. A quantity of entertainment credits are earned on this site, which can be later converted by a conversion agency for use in buying/selling items from a vender, who does not accept the entertainment credits. The gambling Web site or credit providing entity website can include options to "play again" (i.e., repeat the credit earning behavior to potentially earn additional non-negotiable entertainment credits) and an indicia 305 for credit redemption opportunities. The indicia can be presented to a customer via a variety of means including but not limited to banners, radio buttons, pop-up windows, embedded links, audio and or video notification, QR or bar codes, flyers, and the like.

GUI 310 can be a checkout window from an e-commerce site. GUI 310 includes payment button 315, which represents a payment option that includes the conversion of non-negotiable credits to purchase the items in the shopping cart. Selection of payment button 315 by a user can produce GUI 320.

GUI 320 can be a display window from a conversion agency. GUI 320 includes display box 322 and buttons 325, 327. GUI 320 can be rendered by any of a variety of means including, but not limited to, a Web browser, a JAVA applet, a PERL script, and the like. In one embodiment, GUI 320 can be contained within the e-commerce site. GUI 320 can display the balance of non-negotiable, entertainment credits earned from one or more game providing entities. GUI 320 contains a means by which the user selects the type of non-negotiable credits to convert including, but not limited to, a set of radio buttons, a set of checkboxes, a highlighting mechanism, and the like. Display box 322 can display the monetary value of the selected non-negotiable credits. The value displayed in display box 322 can be based on preset conversion factors.

Button 325 can represent the initiation of the process by which the selected non-negotiable credits are converted to negotiable funds and/or entity independent funds. Button 327 can allow a user to purchase additional entertainment credits at predetermined exchange rates or engage in a credit advance when the option is available to the customer. For example, a credit account holder may wish to engage in a loan policy for credits in exchange for a guarantee of future acts or behavior that would earn him or her non-negotiable credits. The credit loan is a policy that can take advantage of a credit account holder's lack of impulse control in regards to purchasing behavior by allowing a user to immediately purchase a desired good or purchase but delay payment until a later time. In another embodiment, the credit advance or loan can be an immediate purchase of non-negotiable credits with negotiable funds to supplement earned entertainment credits. Selection of button 325 by a user can produce GUI 330.

GUI 330 can be a display window from a conversion agency. GUI 330 includes yes button 332 and cancel button 333. GUI 330 can be rendered by any of a variety of means including, but not limited to, a Web browser, a JAVA applet, a PERL script, and the like. In one embodiment, GUI 330 can be contained within the e-commerce site. GUI 330 can display a summary message of the transaction initiated by GUI 320. GUI 330 can include a means to continue the transaction, yes button 332, and a means to cancel the transaction, cancel button 333. Selection of cancel button 333 by a user cancels the transaction and can return the user to GUI 320. Selection of yes button 332 by a user completes the transaction initiated in GUI 320 and can produce GUI 340.

GUI 340 can be a display window from the same said e-commerce site. GUI 340 can contain a message acknowledging the successful conversion of the user's non-negotiable credits into negotiable funds and/or entity independent funds for the purchase of the items in the shopping cart.

Figure 4:
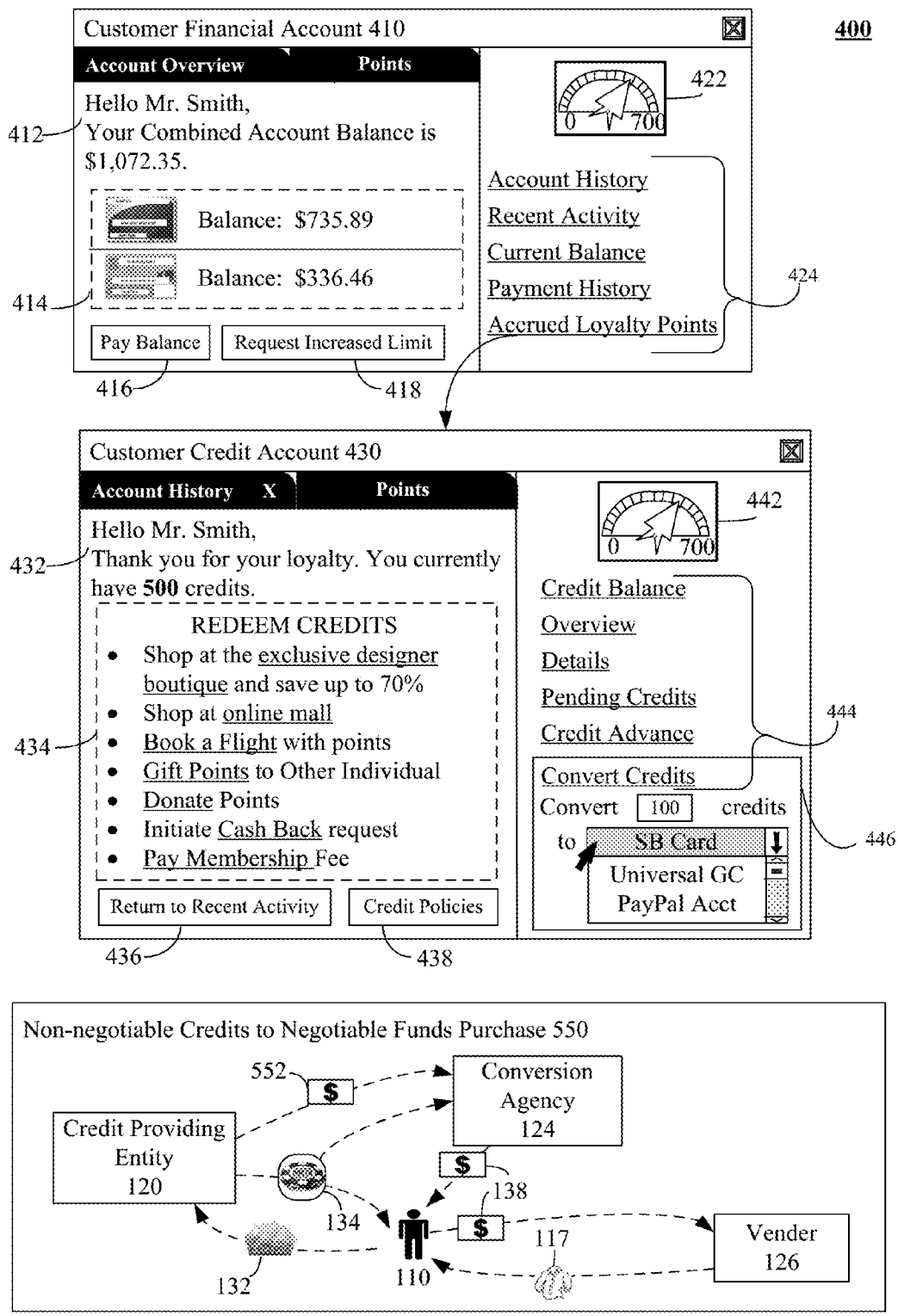
FIG. 4 is a depiction of a scenario and a set of GUIs for granting entertainment credits and presenting indicia for conversion opportunities of the non-negotiable funds earned by a consumer through interactions with the credit granting entity into negotiable funds in accordance with an embodiment of the inventive arrangements disclosed herein.

FIG. 4 is a depiction 400 of a scenario 450 and a set of GUIs 410, 430 for granting entertainment credits and presenting indicia for conversion opportunities of the non-negotiable funds earned by a consumer through interactions with the credit granting entity into negotiable funds and/or entity independent funds in accordance with an embodiment of the inventive arrangements disclosed herein.

Customer financial account 410 can include a user prompt 412 that can present the customer with his or her summary information, a user account overview 414, buttons for typical options such as pay balance 416 and request increased limit 418, credit indicator 422, and account navigation options 424. User account overview 414 can present the customer with one or more financial account types for the customer. Each account can be eligible for loyalty point accrual through a variety of options.

For example, user account type one could be eligible for a fixed 5 points per transaction credit reward and card two could allow varying levels of point accrual for different types of transactions (e.g., five point per dollar spent for automotive expenses, 3 points per dollar spent for travel and restaurants, and 1 point per dollar for all other purchases). Credit indicator 422 can provide the customer with a visual display of the number of loyalty points he or she has accrued to date and selecting the point specific account navigation option 424 can launch customer credit account GUI 430.

Customer credit account 430 GUI can include summary 432, redemption options 434, buttons for navigation such as a button to return to recent activity 436 (for example, GUI 410), and credit account specific navigation options 444, including an option to convert credits 446 to other payment artifacts (for example, transferring converted funds to a customer's PAYPAL account, or an entity specific gift card). Summary 432 can present the customer with an overview of the total balance of points earned to date (which can be visually seen via indicator 422.

Redemption option indicator 434 can present the customer with a selection of or all available options for spending his or her accrued loyalty points. Such options can include, but are not limited to, shopping at an exclusive discount designer boutique, an online mall, booking a flight with points, gifting points to another individual or donating points to an organization or cause, initiating a cash-back request based on a specified conversion ratio, paying a membership or subscription fee with points, and the like. It should be understood that each of these redemption options can be subject to a differing conversion rate set by either the conversion agency 124 or credit granting entity 120.

Scenario 550 depicts one viable scenario for a non-negotiable credits to negotiable funds and/or entity independent funds purchase which can include interactions between a user 110, credit providing entity 120, conversion agency 124 and vender 126. It should be noted that the separate entities are not affiliated with one another and can be separate legal entities. User 110 can engage in a consumer incentive activity 132 provided by credit providing entity 120 which in turn provides user 110 with credits 134 as a reward for engaging in the sponsored activity. The non-negotiable credits 134 can be passed onto the conversion agency 124 upon a user request or a user initiation of a purchase with credits.

In one embodiment conversion agency 124 can be compensated for their services by the credit providing entity through compensation payment 552. In another embodiment, conversion agency 124 can build in compensation for their services through a processing or handling fee passed onto the user 110. Conversion agency 124 can then provide the user with access to negotiable funds 138 to be utilized in the user initiated transaction with vender 126. Vender 126, upon receipt of payment 138, can provide the user 110 with his or her desired good or service purchased.

Figure 5:
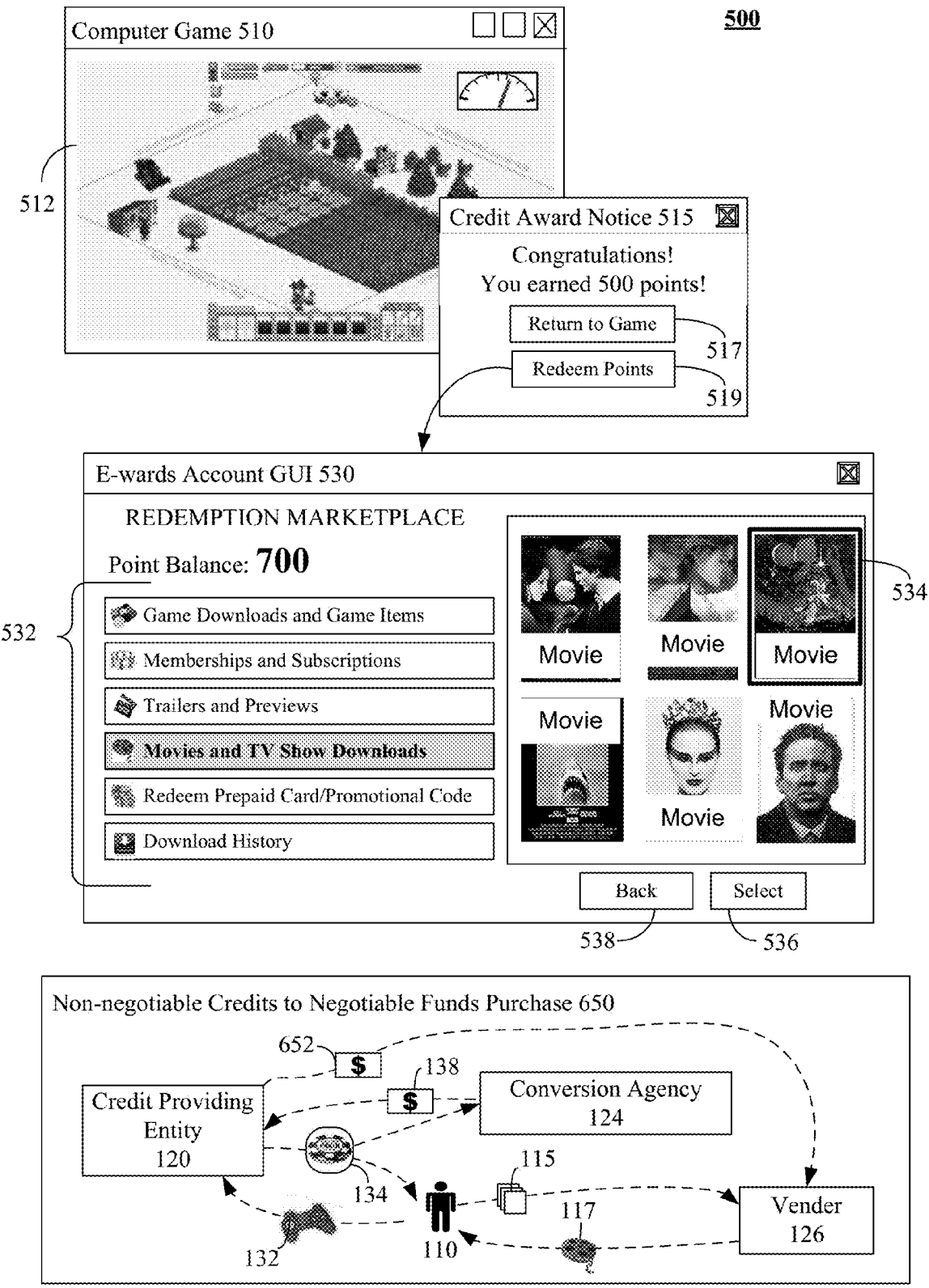
FIG. 5 is a depiction of a scenario and a set of GUIs for granting entertainment credits and directing a consumer to conversion opportunities of the non-negotiable funds earned by the consumer through a game of chance with the credit granting entity into negotiable funds in accordance with an embodiment of the inventive arrangements disclosed herein.

FIG. 5 is a depiction 500 of a scenario 550 and a set of GUIs 510, 530 for granting entertainment credits and directing a consumer to conversion opportunities of the non-negotiable funds earned by the consumer through a game of chance with the credit granting entity into negotiable funds and/or entity independent funds in accordance with an embodiment of the inventive arrangements disclosed herein.

Computer game 510 (accessed, for example, through a social networking site, online multiplayer games, etc.) can allow a user to accrue points or non-negotiable credits through a variety of options such as reaching certain levels, obtaining certain statuses, succeeding in a variety of user collaboration scenarios, and the like. When a user is awarded points a credit award notice 515 can inform the user that he or she has successfully completed a challenge or milestone and has been rewarded a number of entertainment credits. Credit award notice can include buttons for returning to the game 517 and continue accruing points and redeeming points 519. Should a user elect to redeem his or her points immediately, e-wards account GUI 530 can be launched.

E-wards account GUI 530 (e.g., redemption marketplace) can indicate a total user point balance, redemption options 532, and a browsing interface for selection 534, as well as include buttons to select 536 an option, and a back 538 button. Redemption options 532 can include, but are not limited to, game downloads and game items, memberships and subscriptions, trailers and previews, movies and TV show downloads, redeeming prepaid cards or promotional codes and viewing a user download or redemption history. Game downloads and game items can include a new game, special levels opening up upon a user reaching a certain level or completing a certain action in a game, an option to purchase upgrades to user equipment or game achievements, and the like. Memberships and subscriptions can include gym memberships, magazine or newspaper subscriptions, and the like. Other options and components for credit redemption are contemplated.

Non-negotiable credits to negotiable funds and/or entity independent funds purchase scenario 650 can include interactions between a user 110, credit providing entity 120, conversion agency 124, and vender 126. User 110 can engage in game of chance 132 with credit providing entity 120 in exchange for non-negotiable credits 134. Non-negotiable credits 134 can then be passed on to conversion agency 124 for conversion to negotiable funds and/or entity independent funds when requested by user 110 and can be returned to credit providing entity 120 for holding in a user account to be utilized on behalf of user 110 when requested.

Upon user 110 initiating a purchase with vender 126 through a request 115, credit providing entity 120 can provide vender 126 with negotiable funds and/or entity independent funds 652 prompting vender 126 to provide user 110 with goods or services 117 (for example, a video download or streaming rental). In this instance, vender 126 does not accept non-negotiable credits 134 as payment and negotiable funds and/or entity independent funds 652 are provided seamlessly so vender 126 is not aware of user 110 having paid in earned non-negotiable credits 134.

Figure 6:
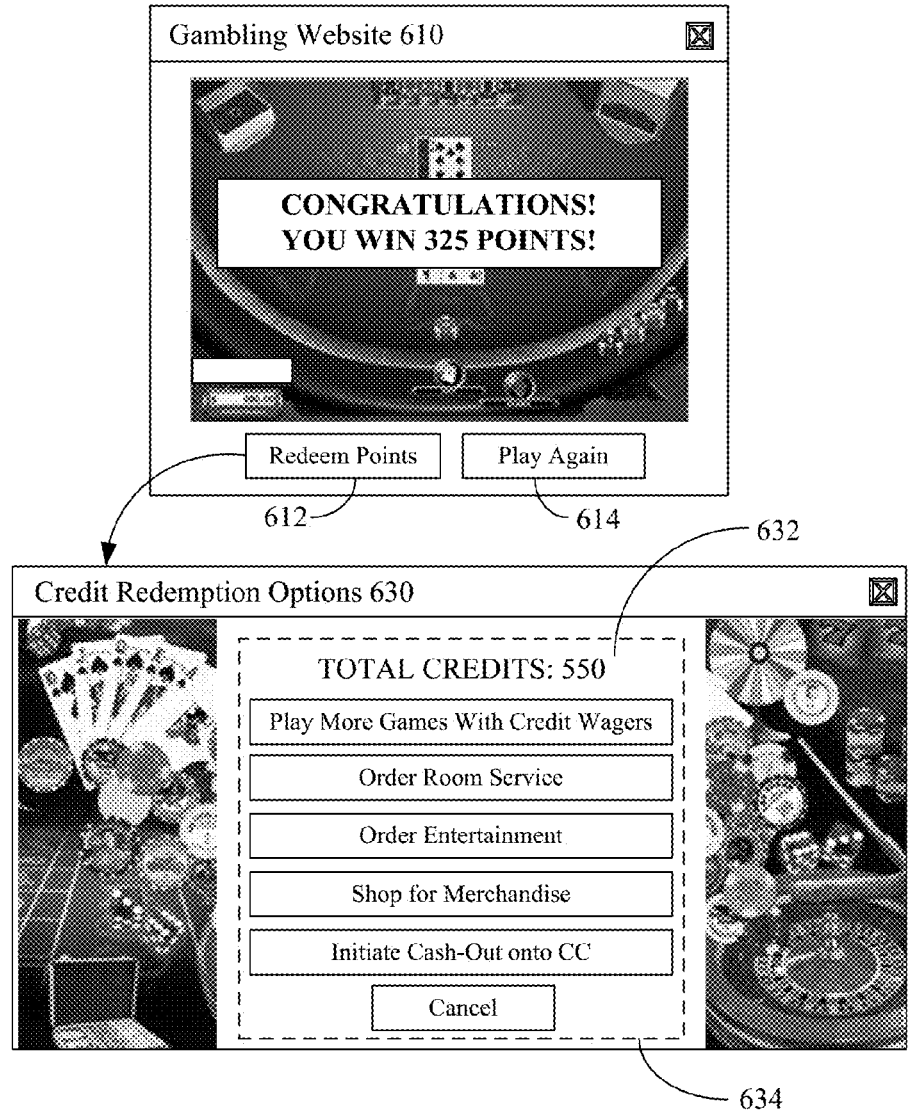
FIG. 6 is a depiction of a scenario and a set of GUIs for granting entertainment credits and directing conversion opportunities of the non-negotiable funds earned by a consumer through a gambling activity with the credit granting entity into negotiable funds in accordance with an embodiment of the inventive arrangements disclosed herein.
Figure 6:
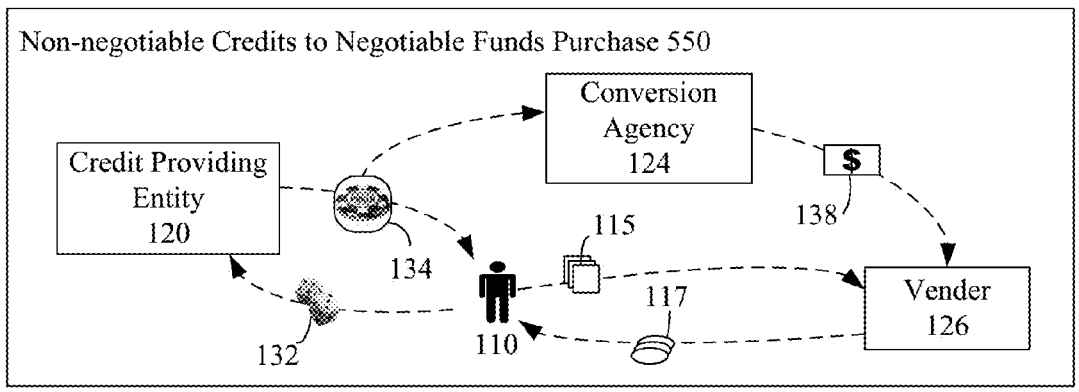

FIG. 6 is a depiction 600 of a scenario 650 and a set of GUIs 610, 630 for granting entertainment credits and directing conversion opportunities of the non-negotiable funds earned by a consumer through a gambling activity with the credit granting entity into negotiable funds and/or entity independent funds in accordance with an embodiment of the inventive arrangements disclosed herein.

Gambling website 610 can provide an online gambling opportunity 612 for customers where customers can earn points or non-negotiable credits in exchange for wining a gambling game. The number of credits earned can depend on the specific wager or odds or be fixed to a set amount per play. Upon successful completion (i.e., a win) of gambling game 612, gambling website 610 can present the customer with notice 614 informing the customer of the number of credits he or she has won. In addition, gambling website 610 can present the user with an indicia button 616 to redeem points or an option to play again 618.

User selection of the redeem points button 616 can launch credit redemption options 630 GUI. Credit redemption GUI 630 can present a customer with his or her total credit balance 632 as well as credit redemption options 634. Redemption options 634 in this instance can include options to play more games with credit wagers, order room service in a casino hotel room when available, order in room entertainment such as movies or TV shows or even purchasing tickets to events, shopping for merchandise or initiating cash-out to a credit card or other payment artifact. An option to cancel and return to the game is also included.

Non-negotiable credits to negotiable funds and/or entity independent funds purchase scenario 550 can include interactions between user 110, credit providing entity 120, conversion agency 124 and vender 126. In this embodiment's scenario, user 110 can play a gambling game 132 hosted by credit providing entity 120, which in turn can reward user 110 with non-negotiable credits 134 for participating in the gambling game. Non-negotiable credits 134 can be passed on to conversion agency 124 for conversion to non-negotiable funds 138 upon user initiation 115 of a transaction with vender 126. The conversion agency 124 can then upon conversion of non-negotiable credits 134 to negotiable funds and/or entity independent funds 138 pass on the negotiable funds and/or entity independent funds 138 to vender 126 as payment for the user requested goods/services 117. The vender can be unaware the funds are being transferred through the conversion agency 124 and thus from the vender's perspective the transaction is a regular transaction.

Figure 7:
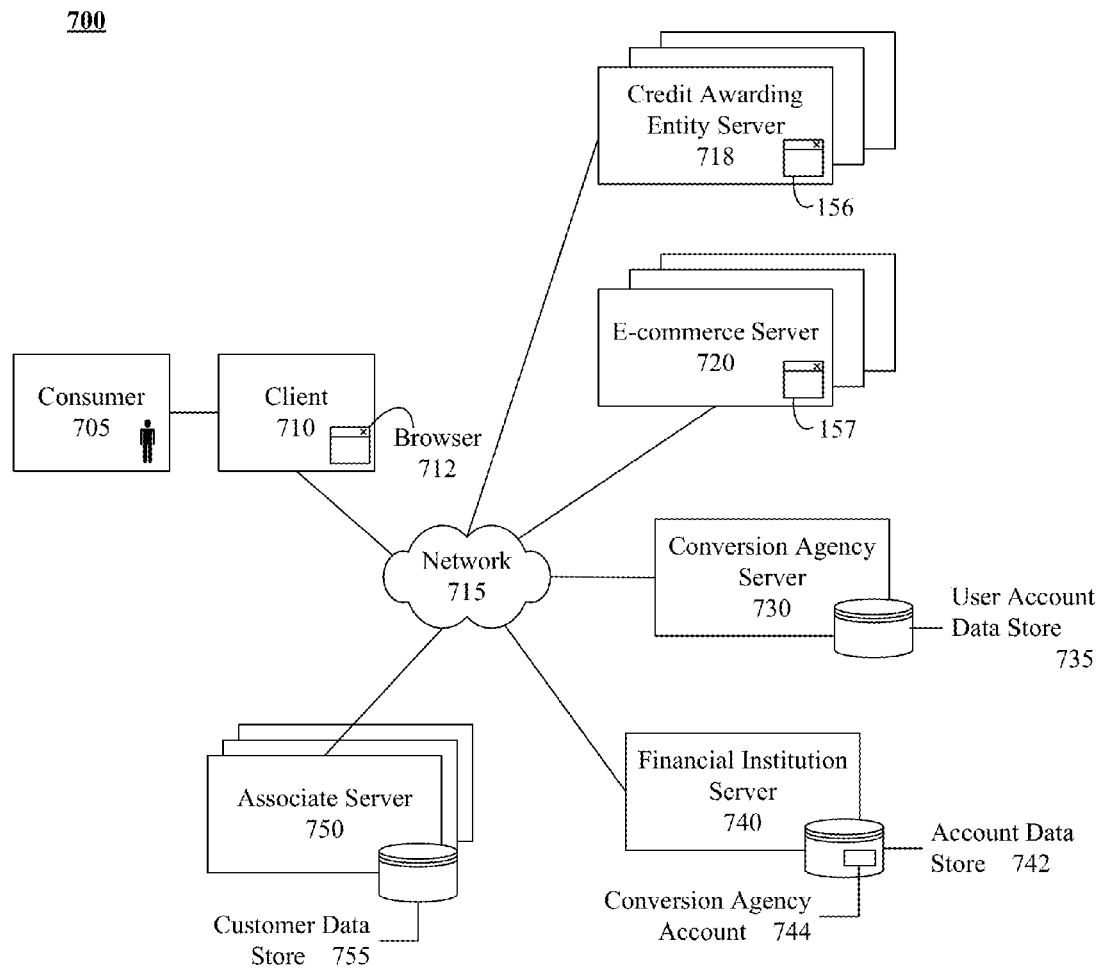
FIG. 7 is a schematic diagram of system for converting non-negotiable credits associated with a game providing entity to negotiable funds in accordance with an embodiment of the inventive arrangements disclosed herein.

FIG. 7 is a schematic diagram of system 700 for converting non-negotiable credits associated with a credit providing entity to negotiable funds and/or entity independent funds in accordance with an embodiment of the inventive arrangements disclosed herein. System 700 can represent a specific embodiment of system 100.

In system 700, consumer 705 can interact with a game of chance server 718, such as through a Web site 156 that server 718 provides. Interactions can occur via a browser 712, rich internet interface, or other software executing upon client 710. Consumer 705 can purchase goods/services from an e-commerce Web site 157 provided by e-commerce server 720. These goods/services can be purchased using negotiable funds and/or entity independent funds that a conversion agency server 730 provides. The conversion agency server 730 can convert entertainment credits resulting from earnings of a game of chance (non-negotiable funds) into the negotiable funds and/or entity independent funds.

Client 710 can be any of a variety of devices including, but not limited to, a personal computer, a kiosk, a telephone, a personal data assistant (PDA), a mobile phone, and the like. Client 710 can include hardware, such as a processor, a memory, and a bus connecting them (as can server 718, 720, 730, 740, and/or 750). The hardware can execute computer program products (software/firmware) that is stored in a non-transitory storage medium. In one embodiment, client 710 can operate in a stand-alone fashion. Alternatively, client 710 can be a device that cooperatively participates in a network of distributed computing devices. Network 715 can facilitate data exchanges over wireless as well as line-based communication pathways and protocols.

In one embodiment, consumer 705 and conversion agency server 730 can interact with associate server 750, e-commerce server 720, and/or financial institution server 740 via network 715. Conversion agency server 730 includes user account data store 735 in which consumer 705 is a member. Associate server 750 includes customer data store 755 in which consumer 705 is a member. Financial institution server 740 includes account data store 742. Account data store 742 includes conversion agency account 744 corresponding to conversion agency 730.

Consumer 705 can earn non-negotiable credits from games provided by server 718. These earnings (non-negotiable credits) can be managed by associate server 750. The quantity of these non-negotiable credits can be saved in customer data store 755. Consumer 705 can use conversion agency server 730 to convert the non-negotiable credits from associate server 750 into negotiable funds and/or entity independent funds provided to the e-commerce server 720 or financial institution 740. In one embodiment, conversion agency 730 can maintain multiple accounts for the consumer 705. These different accounts can be associated with different game providing entities, and with different types of non-negotiable credits.

For example, consumer 705 can earn 500 credits from participating in an online game hosted by server 718. Consumer 705 can choose to use conversion agency 730 to convert any or all of these credits to a monetary equivalent. Conversion agency 730 withdraws the necessary amount from conversion agency account 744 contained within the account data store 742 of financial institution 740 and transfers it to an account specified by consumer 705. In another example, consumer 705 uses conversion agency 730 to complete a purchase at e-commerce server 720. Again, conversion agency 730 withdraws the necessary amount from conversion agency account 744 contained within the account data store 742 of financial institution 740 and transfers it to the account of e-commerce server 720.

E-commerce server 720 can provide a Web site that supports online purchases of goods or services. In one embodiment, e-commerce server 720 can include a distinct payment option for conversion agency 730. This distinct payment option could process the conversion of credits through their Web site. Alternatively, the distinct payment option could launch an application to process the conversion of credit that is separate from their Web site. In another embodiment, associate server 750 can act as e-commerce server 720. In one embodiment, e-commerce server 720 can provide a software service (or can execute a software module) that permits the sale of goods or services, without necessarily providing a Web site. Further, e-commerce server 720 can be directly replaced with back-end system of a storefront server, serving the same relative functions as described in system 700 of facilitating the sales of goods/services.

Financial institution server 740 can be any of a variety of entities including, but not limited to, a bank, a credit card company, an investment firm, and the like. In one embodiment, financial institution server 740 can reside in the same country as consumer 705 associate server 750, and/or game of chance server 718. In another embodiment, financial institution server 740 can reside in a country other than that of consumer 705 and/or associate server 750.

As shown herein, data stores 755, 735, 742, 176, 174, and the like can be physically implemented within any type of hardware including, but not limited to, a magnetic disk, an optical disk, a semiconductor memory, a digitally encoded plastic memory, a holographic memory, or any other recording medium. Each of the data stores 755, 735, 742, 176, 174 can be stand-alone storage units as well as a storage unit formed from a plurality of physical devices, which may be remotely located from one another. Additionally, information can be stored within each data store 755, 735, 742, 176, 174 in a variety of manners. For example, information can be stored within a database structure or can be stored within one or more files of a file storage system, where each file may or may not be indexed for information searching purposes.

The network 715 can include any hardware/software/firmware necessary to convey digital content encoded within carrier waves. Content can be contained within analog or digital signals and conveyed through data or voice channels and can be conveyed over a personal area network (PAN), a local area network (LAN), or a wide area network (WAN). The network 715 can include local components and data pathways necessary for communications to be exchanged among computing device components and between integrated device components and peripheral devices. The network 715 can also include network equipment, such as routers, data lines, hubs, and intermediary servers which together form a packet-based network, such as the Internet or an intranet. The network 715 can further include circuit-based communication components and mobile communication components, such as telephony switches, modems, cellular communication towers, and the like. The network 715 can include line based and/or wireless communication pathways.

Figure 8:
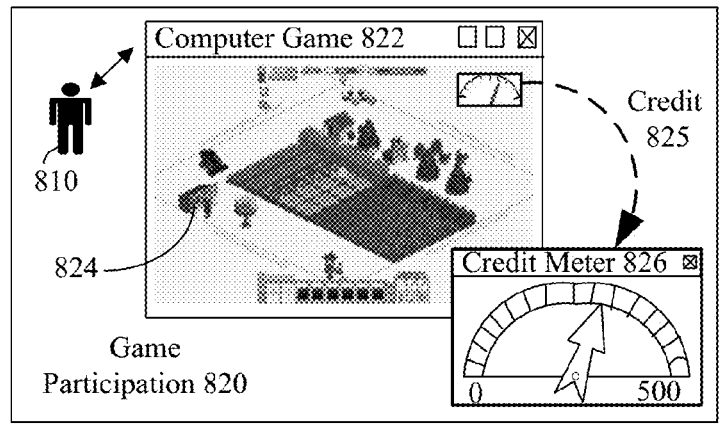
FIG. 8 is a depiction of a scenario and a set of GUIs for converting non-negotiable funds earned through participation awards into negotiable funds in accordance with an embodiment of the inventive arrangements disclosed herein.
Figure 8:
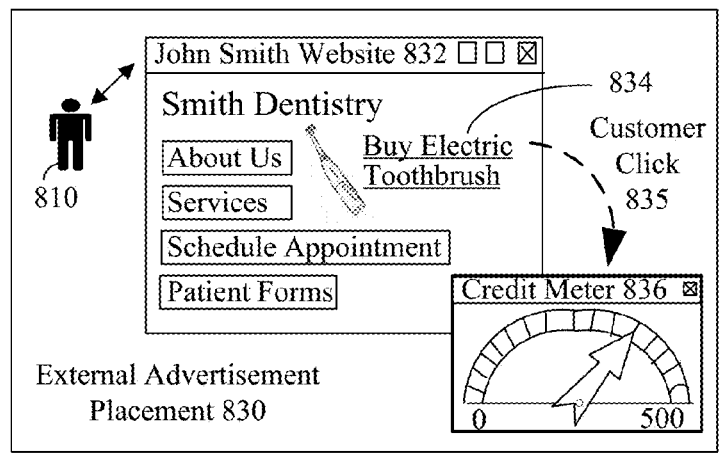
Figure 8:
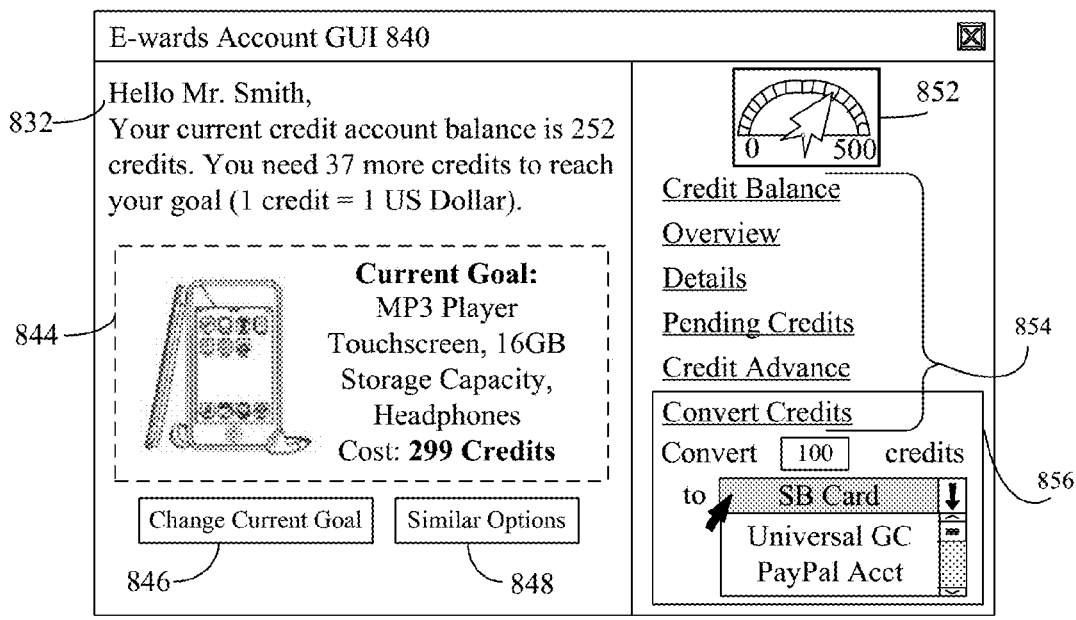

One Embodiment of Disclosure Depicting Participation Credits for Targeted Goal FIG. 8 is a depiction 800 of scenarios and a set of GUIs for converting non-negotiable credits earned through participation awards into negotiable and/or entity-independent funds in accordance with an embodiment of the inventive arrangements disclosed herein. It should be understood that embodiments illustrated in FIG. 8 are not intended to be limiting and other embodiment for a user 810 to obtain participation credits are contemplated. The embodiment discussed in FIG. 8 are for illustrative purposes to convey the act of earning credits through a participatory consumer incentive activity as made available by a credit providing entity.

In game participation embodiment 820, user 810 can play a designated computer or video game 822 such as Farmville, World of Warcraft, Eve, Civilization, and the like and perform actions 824 in the game 822 that can earn user 810 credits that are reflected in a credit meter 826. Actions 824 that can warrant credits 825, can be predetermined by a computer game provider (i.e., credit providing entity). It should be noted that these computer game 822 earned credits 825 are for virtual world actions and interactions. As such, a user 810 is not limited to real world actions for earning credits. A virtual world is an online community that can take the form of a computer-based simulated environment through which users can interact with one another and use and create objects. Virtual worlds are not limited to games but, depending on the degree of immediacy presented, can encompass computer conferencing and text based chatrooms.

It should be appreciated that in one embodiment, when a user is participating in an RPGA game, and as a result of his or her virtual actions in the game environment receives virtual "gold" for an "IOU", this transaction can also be considered to be a conversion from non-negotiable (the IOU) to negotiable and/or entity-independent funds (gold). Similarly, a sale of a magic sword (to be considered a credit or non-negotiable fund) that is conducted with a payment of (and as such is "converted to" virtual gold can be considered a conversion transaction resulting in negotiable and/or entity-independent funds. As such, neither the credit (subsequent non-negotiable fund) nor the negotiable fund need be real world items. A conversion from a non-negotiable fund to a negotiable fund can occur fully in a virtual world environment.

Actions 824 that can warrant credits 825 can include actions that lead to specific level achievements, high scores, interacting with or collaborating with other users in a certain manner should the game be a multiplayer game, and the like. Actions 824 that warrant credits 825 can, in one embodiment, be unknown to a user 810 prior to achieving the credit 825 award, encouraging users to continue participation in the game for a possible future credit 825 award to increase their credit balance as tracked by credit meter 826. In another embodiment, actions 824 can be known and provider user 810 with a roadmap to follow to earn certain credits to reach his or her own goal of accrued credits 825. In one embodiment, credit meter 826 can also include a notification of the current or effective conversion ratio applying to the earned credits 825.

In external advertisement placement 830, user 810 can host his or her own website 832. Part of this site 832 can be an advertisement 834 for external content or products. The advertisement can be for adjacent market goods to allow an adjacent market entity to take advantage of adoption order as well as commonality of requirements or relationships due to the fact that adjacent market segments share common characteristics in application requirements and ecosystem, or community, relationships.

For example, the electric toothbrush market (part of the oral hygiene market), can be adjacent to the market for dental services. As such, John Smith's Dentistry website 832 can include an external advertisement for an electric toothbrush 834 or an airline website can enable visitors to also view external advertisement offers from car rental companies or destination city hotels. It should be noted that an external advertisement need not be for an adjacent market good or service. Upon each consumer click 835 of the external ad posted to John Smith's site 832, John Smith can receive credits as shown on his credit meter 836. The credit meter 836 can be a personal credit mater for John Smith or a credit meter for the Smith Dentistry business entity.

The credits per click 835 can be collected from the entity whose goods and/or services are being advertised on John Smith's website 832. However, the credits can, in one embodiment, also be awarded to person 810 by a third party non-affiliated entity that is engaged in business with the entity whose goods and services are being advertised. Such a third party entity can be situated in the marketplace to provide credit payment services (in effect a type of conversion payment entity that can optionally charge advertising entity a selling exchange rate for the conversion or a type of "commission" as mentioned previously).

E-wards Account GUI 840 illustrates one embodiment of a credit account management GUI. The GUI or control element of one's credit account can be accessible from a dedicated site or be accessible from a plug in or linkage within a game or e-commerce site, and the like. In one embodiment, an e-wards GUI 840 can present the account holder with summary information 842 that can be linked to a user selected goal 844 purchase (users can thus be reminded of their end reward for participating in credit earning activities. Options to change a current goal 846, view similar options 848 to goal 844, and the like, can be interactive options for e-wards account GUI 840.

Additionally, the GUI 840 can include a visual representation of a user's current credit meter 852 totaling a user's accrued credits from various actions and behaviors (for example, credits accrued from game participation 820 or external advertisement placement program 830. In another embodiment, the visual representation 852 can be incorporated into an e-commerce website letting a user know how many more credits he or she would have to accrue to purchase certain selected items. Account management options 854 can include a plethora of options, such as credit balance check, an overview, detailed history, pending credits (both to be received in the account as well as credits to be converted), an option for a credit advance (further expounded upon in FIG. 6), and an option to convert credits.

In one embodiment, a conversion from non-negotiable credits to negotiable and/or entity-independent funds can include selecting to apply discounts and promotions such as rewards earned through loyal customer appreciation (e.g., free shipping from an e-commerce entity, a coupon for 80% off a future purchase, and the like). In another embodiment, the option 854 to convert credits can include a quick conversion form 856, wherein a user can designate an amount of credits to be converted and placed on a user or account owner selected (pre-registered) gift card, store member card, payment account (such as PAYPAL), and the like. It should be noted that credit conversion can be designated to be transferred into a financial account (credit account, bank account, or other payment account) or negotiable and/or entity-independent funds instrument (such as a credit card, bank card, store card, or gift card) owned by another person. As such, non-negotiable credits can be transferred from one person to another in the form of negotiable and/or entity-independent funds.

Figure 9:
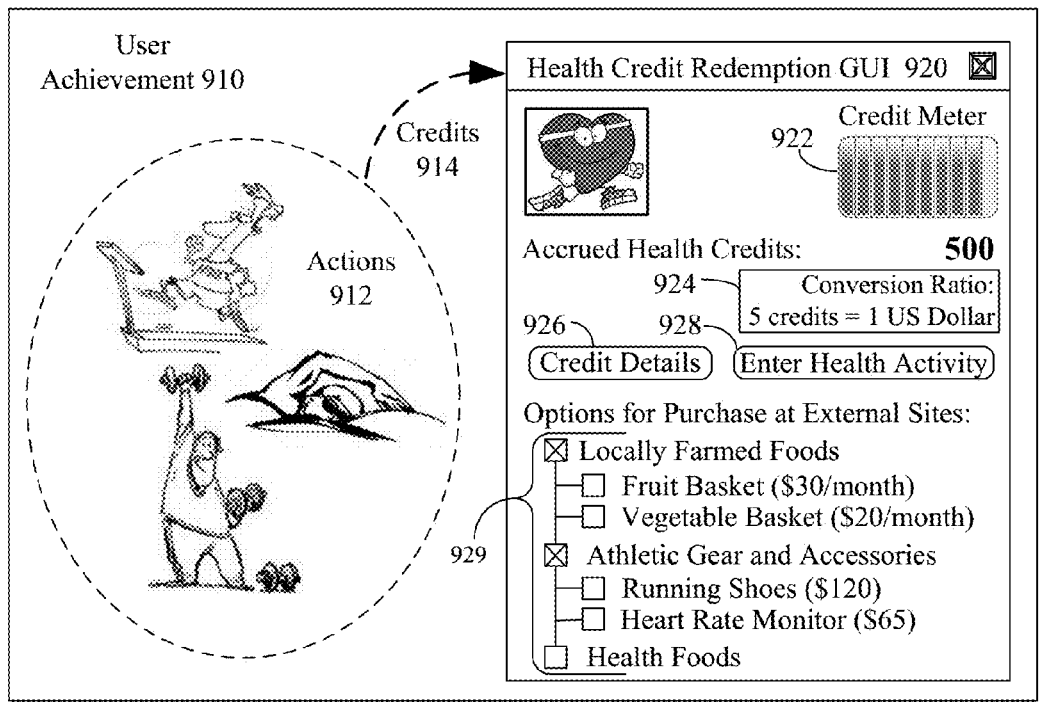
FIG. 9 is a depiction of a scenario and a set of GUIs for converting non-negotiable funds earned through personal achievements into negotiable funds in accordance with an embodiment of the inventive arrangements disclosed herein.
Figure 9:
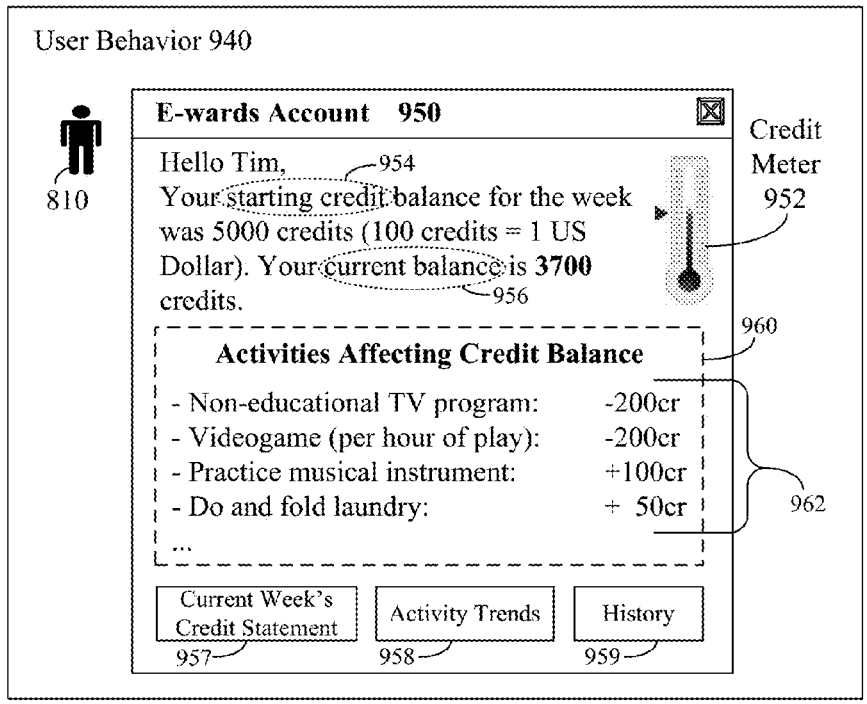

One Embodiment of Disclosure Depicting Achievement Credits for a Targeted Purpose FIG. 9 is a depiction of a scenario and a set of GUIs for converting non-negotiable credits earned through personal achievements into negotiable and/or entity-independent funds in accordance with an embodiment of the inventive arrangements disclosed herein. It should be understood that embodiments illustrated in FIG. 9 are not intended to be limiting and other embodiments for obtain achievement credits are contemplated. The embodiment discussed in FIG. 9 are for illustrative purposes to convey the act of earning credits through an achievement focused consumer incentive activity as made available by a credit providing entity.

In this instance, the concept of giving (and removing) credits is based on an incentive structure present in human behavior (remunerative or financial incentive in this instance). As used herein, an incentive is any factor (financial or non-financial) that enables or motivates a particular course of action, or counts as a reason for preferring one choice to the alternatives. More specifically, it is an expectation that encourages people to behave in a certain way.

User achievement embodiment 910 can be an example of one such incentive utilizing embodiment for achieving credits to be converted to negotiable and/or entity-independent funds. In this specific embodiment, an incentive can be health targeted rewarding a user for his or her health related achievements and can be sponsored by a specific entity (such as, for example, weight watchers and the like). It should be understood that other embodiments are contemplated. In this specific user achievement 910 embodiment, user actions 912 (such as swimming a certain number of laps, running a given amount of time or burning a specific number of calories from running, etc.) can garner a user credits 914 in the form of non-negotiable credits.

Credits 914 can be tracked and available for use in purchases through health credit redemption GUI 920. Health credit redemption GUI 920 can in one embodiment be maintained by the achievement credit sponsoring entity and credit conversion to negotiable and/or entity-independent funds can be limited to purchase of health related goods. In another embodiment, GUI 920 as well as a user's credit balance can be maintained by another entity and credits can be converted to negotiable and/or entity-independent funds without limitations on purchases. GUI 920 can include a credit meter 922, and a specific conversion ratio 924 notice. Additionally, GUI 920 can include a button to call upon credit details 926, and a button for a user to enter his or her recent health activity 928 to be converted to credits 914.

In one embodiment, entering health activity for credits can be restricted to a user's personal trainer or health representative to prevent abuse of credit garnering behavior by a user. In another embodiment, a record keeping device (such as an athletic watch or heart rate monitor, a lap counter, or a combination of such devices) can be utilized to download data into GUI 920 to maintain accurate records of health activities and assign a correct number of credits 914 to a user's health credit redemption GUI 920 account and credit meter 922. Other methods of entering health activity for credit conversion are contemplated.

It should also be noted that other types of achievement credit embodiments are contemplated. Other embodiments need not be behavior based as they can, for example, be based on a financial threshold. To illustrate, in one embodiment, a user can buy or rent a certain number of DVDs and when he or she has reached a threshold for the number he or she has spent negotiable and/or entity-independent funds on, be awarded with a non-negotiable credit for a movie ticket at a theatre. That credit can then be converted to a negotiable fund upon purchasing a movie ticket or reselling the voucher or credit to another person in exchange for negotiable and/or entity-independent funds.

GUI 920 can also include purchase options 929 at external sites (unaffiliated with the credit providing entity), as well as a list of types of options 932 (which can in one embodiment include direct links). Purchase options 929 can in one embodiment be based on a user's purchase history regarding achievement type which can also include purchases acquired without credit conversion (such as a complete AMAZON account purchase history analysis, and the like).

Other achievement based embodiments 910 are contemplated. For example, another embodiment 910 can include programs set up through children's schools or parents or a combination of the two, wherein certain grades, points, or extra credits can earn children for example a new Nintendo cartridge linked to academic programs and educational content. Additional points gained from playing these educational games can lead to additional credits to be converted to negotiable and/or entity-independent funds to be used to purchase goods or services.

A reverse system to the one described in user achievement embodiment 910, can be a user behavior embodiment 940. In this embodiment, a user 905 can engage in the reverse of accruing credits. That means a user 905 can lose credits based on bad behavior, which can function as negative feedback in an effort to influence a user 905 behavior. The user 905 can, in one embodiment, have options for making up for losing bad credits but can be limited to a ceiling of credits earned within a given timeframe.

For example, as e-wards account 950 GUI demonstrates, a user can have a starting balance 954 (in this instance for a weekly "allowance" of credits, which can also be for a monthly balance, etc.), as well as a current credit balance 956 (which can reflect a user's credit balance based on behavioral credit deductions and additions) as reflected by credit meter 952. GUI 950 can also include a credit balance activities 960 guide that can demonstrate a list of activities (positive as well as negative) 962 to allow user 905 to properly gage his or her behavior and adjust it according to his credit meter 952 balance and desired outcome of the weekly credit balance to be available for conversion to negotiable and/or entity-independent funds at the end of the determined time period for the credit allowance. List 962 can be can be modified as needed by a sponsoring entity that provides credits to user 905 based on his or her behavior.

One Embodiment of Disclosure Depicting Sponsored Initiative Credits

Figure 10:
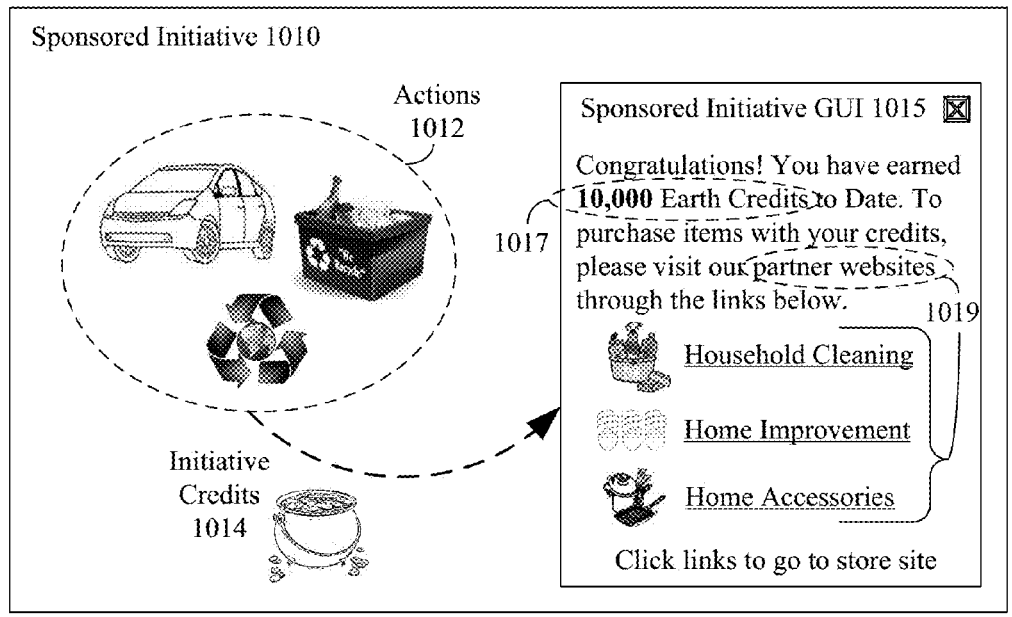
FIG. 10 is a depiction of a scenario and a set of GUIs for converting non-negotiable funds earned through sponsored initiatives or subsidies into negotiable funds in accordance with an embodiment of the inventive arrangements disclosed herein.
Figure 10:
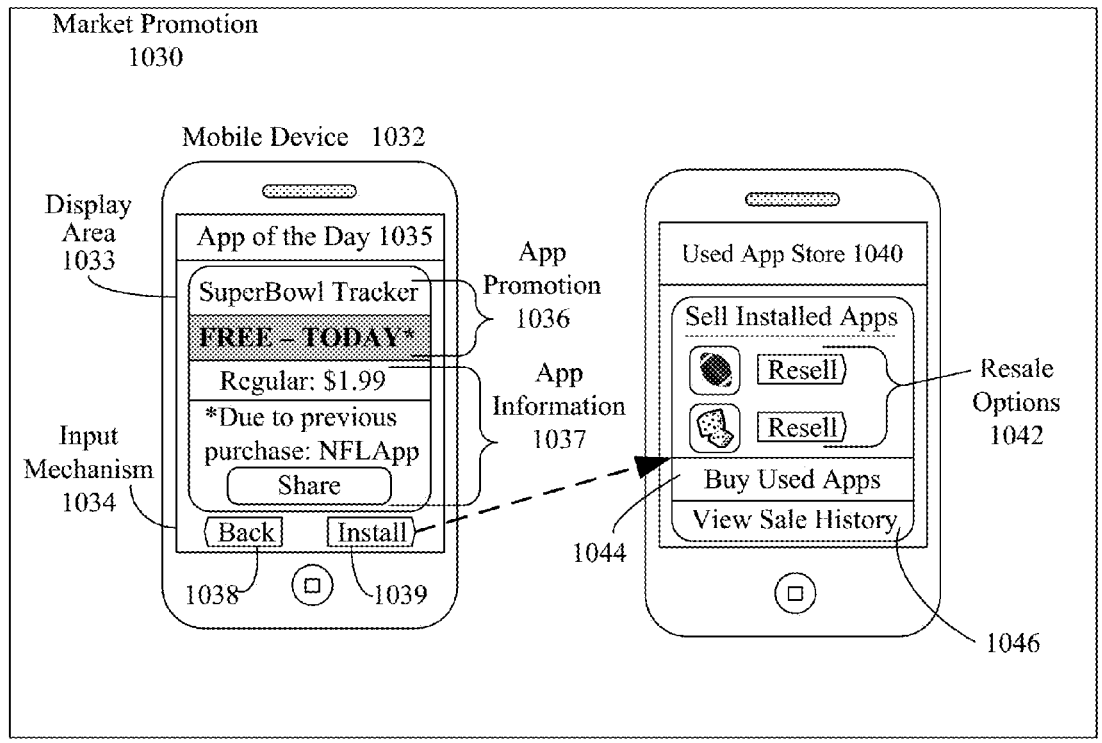

FIG. 10 is a depiction of a scenario and a set of GUIs for converting non-negotiable credits earned through sponsored initiatives or subsidies into negotiable and/or entity-independent funds in accordance with an embodiment of the inventive arrangements disclosed herein. The additional incentives depicted in the following description are broader and economy or market based than the incentive structure discussed in FIG. 9.

Unlike a private good (such as an individual's own health), in this case credits can be earned from enhancing a public good or service. As used herein, a public good is a good that is non-rival and non-excludable. Non-rivalry means that consumption of the good by one individual does not reduce availability of the good for consumption by others; and non-excludability means that no one can be effectively excluded from using the good. Non-excludability may cause problems for the production of such goods. Uncoordinated markets driven by self-interested parties may be unable to provide these goods in optimal quantities, if at all. As such, subsidies can be used as incentives for individuals to contribute to or produce a public good.

A subsidy can be an assistance paid to a business or economic sector through a variety of ways (either directly to the business or industry or indirectly through subsidizing the business or industry's consumers' purchases). Most subsidies are made by the government, but can also be an assistance granted by others such as individuals or non-governmental institutions, to producers or distributed as subventions in an industry to prevent the decline of that industry (e.g., as a result of continuous unprofitable operations) or an increase in the prices of its products or simply to ensure it remains competitive.

The type of subsidy applied in the sponsored initiative embodiment 1010 and the market promotion embodiment 1030 is generally referred to as a direct subsidy or consumption subsidy meaning that an entity provides economic incentives (credit subsidies to be converted to "cash" or negotiable and/or entity-independent funds) to a purchaser or user of a good or service. For example, sponsored initiative embodiment 1010 shows a subsidy project, in this instance a green initiative, where individuals can receive non-negotiable credits 1014 from engaging in green actions and behavior 1012 such as carpooling, recycling, buying electric cars, and the like.

To further enhance the economic sector of the green initiative and maintain its competitiveness the non-negotiable credits 1014 can be converted to negotiable and/or entity-independent funds to be utilized in the purchase of further green products and services tracked in sponsored initiative GUI 1015. Sponsored initiative GUI 1015 can track and maintain a credit balance 1017 to be redeemed for products 1019 offered by sponsored and approved green initiative venders that are not affiliated with the original credit providing entity. Other types of subsidy credits are contemplated and the above example is not intended to be limiting.

An additional type of subsidy credit can be a market promotion embodiment 1030. It should be noted that while the following description centers on a mobile application, the disclosure should not be construed as limited to a mobile application. Market promotion embodiment 1030 can include a mobile device 1002, for example an iPHONE or ANDROID smartphone, which can provide access to a credit earning and conversion application. The mobile device 1032 can include a display area 1034 and an input mechanism 1036, which, in this example, are one-and-the-same. That is, the display area 1034 of a mobile device 1032 can also be used as the input mechanism 1036, for example, with a touch screen.

Mobile device 1032 display 1034 can present the user with an app of the day 1035 marketplace. The app of the day marketplace 1035 can include app promotion 1036 summary as well as more detailed app (of the day) information 1037. For example, an NFL Superbowl Tracker application can be offered as a free app of the day. This free app can, in one embodiment, be due to a previous qualifying app purchase as noted in the app information 1037 section. In another embodiment, the app promotion can be freely available to all users regardless of prior app purchases. App of the day 1035 display can also include a back button 1038 to return the user to a prior screen or an install button 1039 to download and install the promoted app of the day 1036 to his or her mobile device 1032. In such a manner a user engaged in a conversion of non-negotiable to negotiable and/or entity-independent funds. The marketplace will offer the app of the day for free to its purchasers (as a non-negotiable credit that to the marketplace is a negative one, expended for marketing, good will, or another intangible benefit) but still reimburse the app provider with the usual amount of payment for the app or the app provider receives a tax write-off, or the like.

In another embodiment, upon successful installation of the app promotion 1036, the user may access a used app store 1040 via mobile device 1032. The Used app store 1040 can present the user with resale options 1042 of installed applications of the mobile device 1032. Additionally, the used app store 1040 can include a button for buying used apps 1044 as well as a button to view sale history 1046. A user selling an application in a secondary marketplace is a type of non-negotiable fund to negotiable fund (money or otherwise) exchange. The sale can be for credits that can be converted to cash or cash itself. The currency for this transaction can, in one embodiment, be tracked and maintained within an e-wallet application or rewards account, and the like.

Other types of promotions for credits are contemplated. For example, airlines allow sales for a limited time period for certain flights or destinations earning a consumer double or triple the loyalty points. Loyalty points can be converted to negotiable and/or entity-independent funds or can be transferred or gifted to another member in a transaction (which can be viewed as the reverse of a non-negotiable to negotiable and/or entity-independent funds exchange from the viewpoint of the account holder).

One Embodiment of Disclosure Depicting Social Networking Credits

Figure 11:
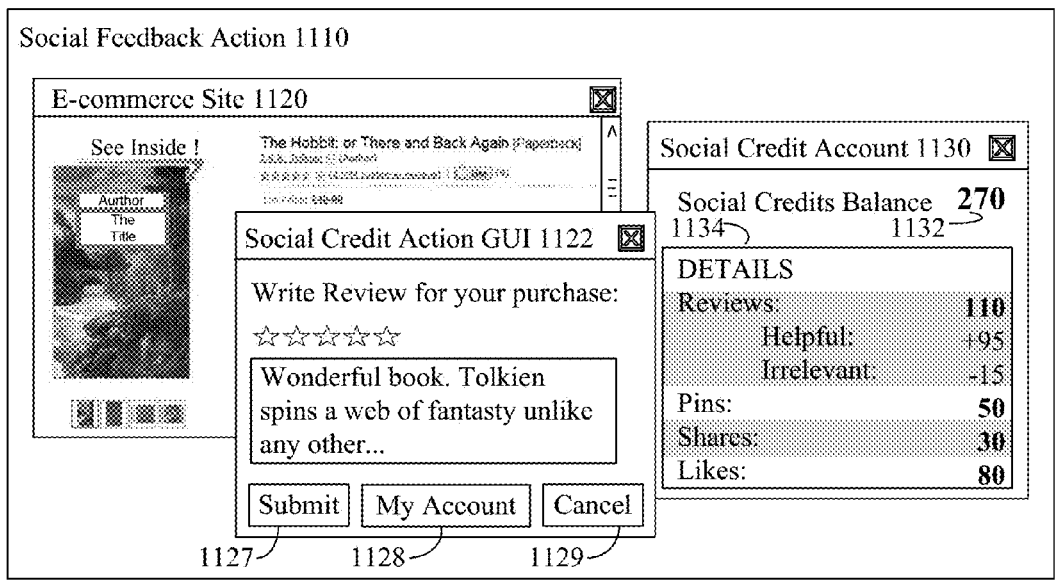
FIG. 11 is a depiction of scenarios and GUIs for converting non-negotiable funds earned through social networking activities into negotiable funds in accordance with an embodiment of the inventive arrangements disclosed herein.
Figure 11:
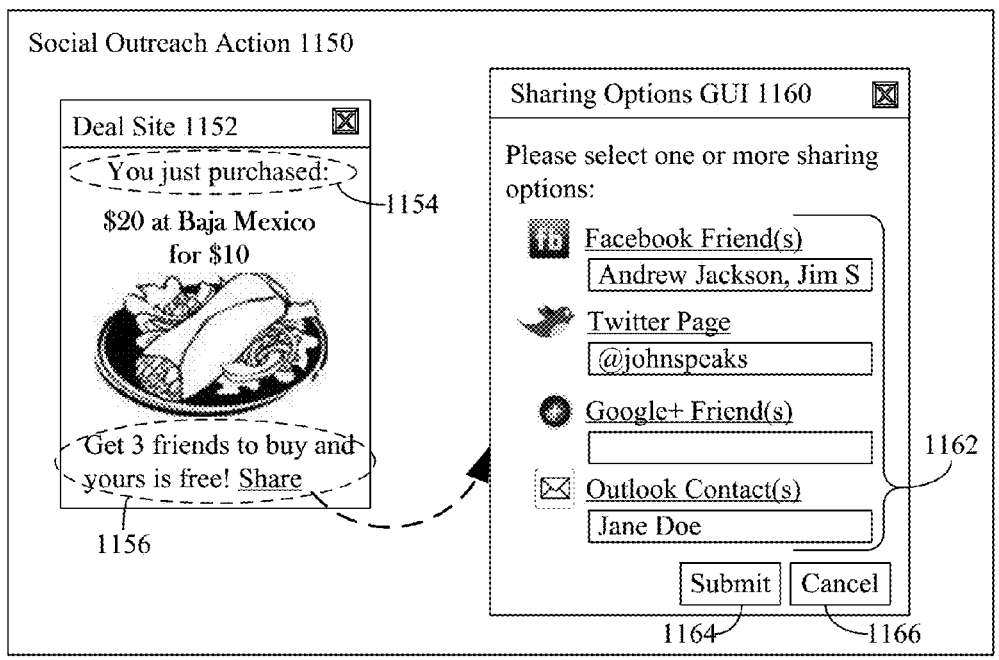

FIG. 11 is a depiction of scenarios and GUIs for converting non-negotiable credits earned through social networking activities into negotiable and/or entity-independent funds in accordance with an embodiment of the inventive arrangements disclosed herein. Many types of social or community enhancing activities are contemplated for the purpose of earning credits to be converted to negotiable and/or entity-independent funds. The following embodiments are for exemplary purposes only and other social networking credit embodiments are contemplated.

Social networking, as used herein, refers to platforms that focus on the building and reflecting of social networks or social relations among people, who, for example, share interests and/or activities. As such they can be individual or group-centered. Social networking services allow users to share ideas, activities, events, and interests within their individual or group networks. Generally, a social network service consists of a representation of each user (often a profile), his/her social links, and a variety of additional services.

It should be noted that most social network services are web-based and provide means for users to interact over the Internet, such as e-mail and instant messaging. As such, social networking credit services can be integrated into e-commerce sites to allow for social feedback actions 1110, social outreach actions 1150, and the like.

Social feedback actions embodiment 1110 can illustrate how a consumer may earn credits from providing reviews or other services that allows other members of his or her social network to act in a more informed manner. Decision making of other members of the social network are improved the more information (or certainty) is added to a specific situation or choice. It should be noted that more informed individuals will be able to make more rational choices in the economic sense, which subsequently facilitates the prediction of market behavior for economic entities. As such, both consumers as well as suppliers benefit from the proliferation of social feedback options for credit.

E-commerce site 1120 can sell products and services and allow purchasers to perform socially serving activities in exchange for providing them with credits in the form of loyalty points, discounts, or other non-negotiable credits. Social credit action GUI 1122 shows one example of such a socially serving activity. In this embodiment, the credit garnering activity can be leaving a review for a previously purchased good such as writing a book review on AMAZON.

Options associated with the social credit action GUI 1122 can include a visual ranking (starts) 1124 option as well as a descriptive text rating 1126. The form can also include a submit button 1127 that can publish the user created review to e-commerce site 1120, and a cancel button 1129 that can return the user to e-commerce site 1120 without publishing a social credit action or review. An optional account button 1128 can provide a means for a credit user to reach his or her awards credit account (such as social credit account GUI 1130) directly from an e-commerce site 1120.

User selection of the account button 1128 can launch the social credit account GUI 1130. The credit account GUI 1130 can include a listing for overall account balance 1132 as well as a details pane 1134. Details pane 1134 can list the user's past credit garnering actions and a breakdown of the amount of credits gained from various types of social feedback actions. For example, a user can have earned credits from writing reviews, sharing a review, liking another individual's review (or marking it as useful or helpful) or receiving a helpful status of one of his or her own reviews.

It should be noted that in one embodiment, receiving a "helpful" status on a written review by another credit account holder can garner a user additional credits to the original writing of the review to encourage honesty and more perfect information to enter the market. Similarly, a user may receive a dock in credits (negative credits) when one of his or her social feedback actions is deemed as irrelevant or untrue. Other options for creating an effective incentive structure for social actions are contemplated. GUI 1130 can also include a button 1136 to encourage use of credits for a purchase.

Social outreach action embodiment 1150 depicts another type of social proliferation of information within the marketplace. In this instance, a deal site 1152 (for example, an e-commerce site providing goods and services as well as daily deals on purchases to customers) can present a consumer with a summary page 1152 of a recently purchased deal for a good or service. The summary page 1154 can include purchase information 1156, as well as a social outreach option 1158 coupled to the recently purchased good or service that can garner a purchaser credits in the form of non-negotiable and/or entity-independent funds.

It should be noted that deal site 1152 can be any site for an entity that can function as a retailer or "front" for other venders (e.g., Amazon, eBay stores, Newegg marketplace, etc.) where any credits, loyalty points, discounts, membership benefits (e.g., even free shipping on AMAZON PRIME) that can be considered an "earning" someone is paying for, involve a conversion of non-negotiable credits to negotiable and/or entity-independent funds from one entity to another. In effect the retailer or front party supplements the vender that it is a storefront for, for the non-negotiable credits extended to the deal site 1152's members or credit recipients.

In one embodiment, there can be a requirement associated with the credits. For example, a requirement can be set that a user's social outreach actions lead to three of his or her social network contacts purchasing the same item before a user will be given credits. In this instance, the credits can be that the original purchaser's transaction is free. This is in effect a set of non-negotiable and/or entity-independent funds extended to the purchaser by the deal site 1152 to be utilized in purchasing (with negotiable and/or entity-independent funds) a deal for goods or services from another entity at a discount.

Selection of the social outreach option 1158 can launch a sharing options GUI 1160 to be presented to the purchaser. Sharing options GUI 1160 can include quicklinks or address fields for social network contact options 1162 (for example, a credit account holder's FACEBOOK friends, TWITTER followers, GOOGLE+ contacts, or OUTLOOK contacts). In this manner, sharing options GUI 1160 can provide convenient and quick dissemination of the site 1152's information to a user's social network. In this embodiment, sharing options GUI 1160 can be coupled to an individual's social networking contact lists. A submit button 1164 can be included to launch messages sharing the deal purchase as well as a cancel button 1166 that can return the user to the deal site 1152.

A further example of vender transactions discussed above can include a phone service company extending a discount on a new mobile phone to a customer for signing an additional contract. The discount the customer receives is a form of non-negotiable fund that the phone service company can convert into negotiable and/or entity-independent funds (as they will be paying the supplier of the new mobile phone the full price for the item). Additional scenarios where an entity supplements another entity downstream for a credit given to a purchaser are contemplated.

One Embodiment of Disclosure Depicting Credit Advance for Future Credits Earned

Figure 12:
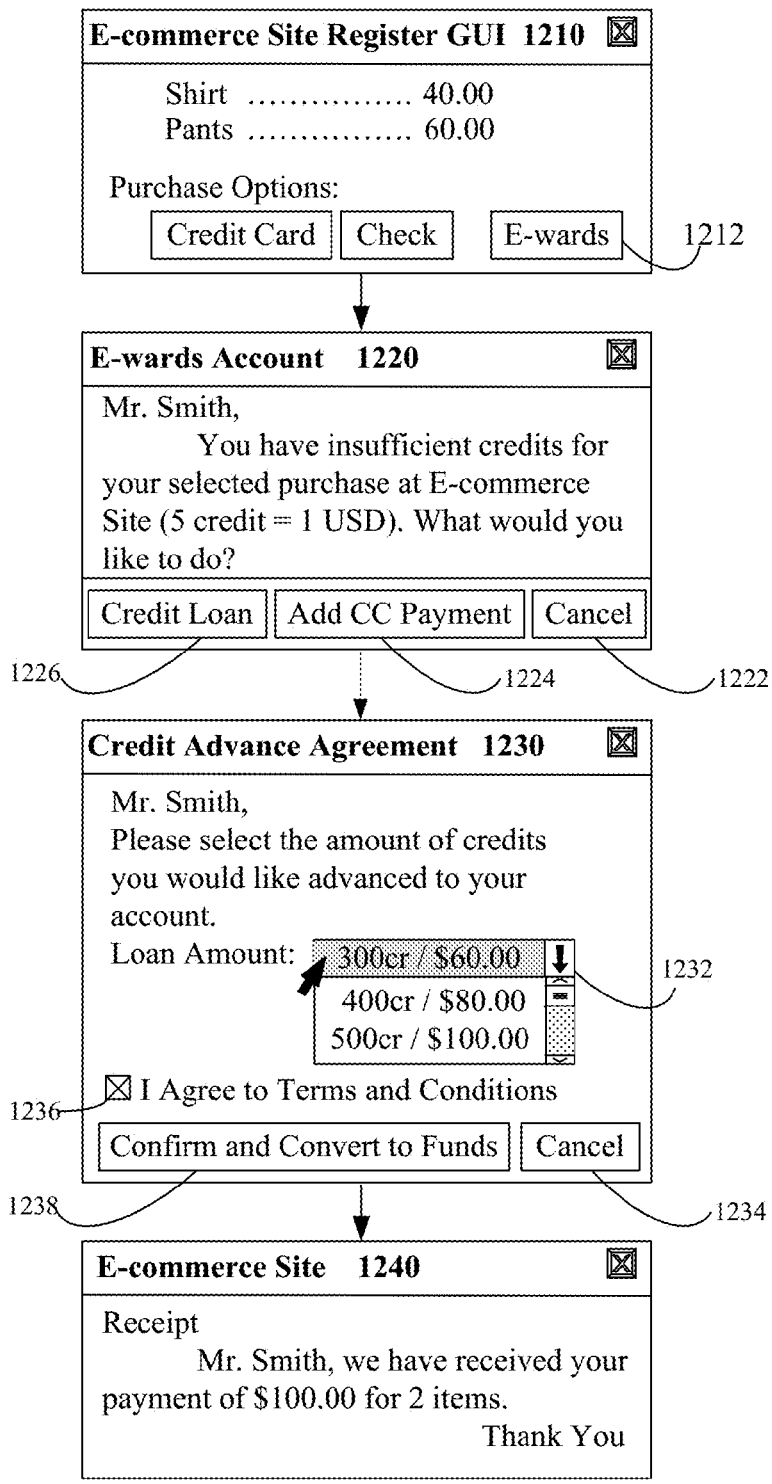
FIG. 12 is a depiction of successive GUIs that illustrate a web based credit advance and subsequent conversion of non-negotiable funds into negotiable funds in accordance with an embodiment of the inventive arrangements disclosed herein.

FIG. 12 is a depiction of successive GUIs that illustrate a web based credit advance and subsequent conversion of non-negotiable credits into negotiable and/or entity-independent funds in accordance with an embodiment of the inventive arrangements disclosed herein. Most of the time, a user will have earned credits from engaging in previous interactions with a credit providing entity. However, it should be appreciated that at times consumers may wish to purchase additional credits or request a credit advance to complete a purchase with non-negotiable and/or entity-independent funds converted to negotiable and/or entity-independent funds.

In this manner, a credit account holder may wish to engage in a loan policy for credits in exchange for a guarantee of future acts or behavior that would earn him or her non-negotiable credits. The credit loan is a policy that can take advantage of a credit account holder's lack of impulse control in regards to purchasing behavior by allowing a user to immediately purchase a desired good or purchase but delay payment until a later time.

As used herein, a loan is a type of debt. Like all debt instruments, a loan entails the redistribution of financial assets over time, between the lender and the borrower. In a loan, the borrower initially receives or borrows an amount of money (or in this instance credits), called the principal, from the lender, and is obligated to pay back or repay an equal amount of credits to the lender at a later time. The credits can be paid back in regular installments, or partial repayments; in an annuity, each installment is the same amount. It should be noted that the loan (or credit advance) can generally be provided at a cost, referred to as interest on the debt, which provides an incentive for the lender to engage in the loan or credit advance.

Conventionally, an advance service for funds can allow credit account holders to withdraw credits, either through an ATM or over the counter at a bank or other financial agency, up to a certain limit. Such advances can generally incur a fee (to replace the interchange fee normally charged to the merchant on a card transaction), although this can be waived if the account is in credit. It should be noted that credit advances can be, but are not required to be administered in a conventional advance service manner. That is, in one embodiment, higher conversion ratios for credit advances can be required for purchases making a credit advance fee dependent upon the amount of credits requested, while in another embodiment a credit advance can include a one-time fixed credit fee associated with the credit loan or advance. It should be understood that other arrangements for the loan of credits to be utilized for conversion to non-negotiable and/or entity-independent funds are contemplated.

E-commerce site register GUI 1210 can be a checkout window from an e-commerce site. GUI 310 includes payment button 1212, which represents a payment option that includes the conversion of non-negotiable credits to purchase the items in the shopping cart. Selection of payment button 1212 by a user can produce GUI 1220.

E-wards account GUI 1220 can be a display window from a conversion agency. GUI 1220 can include a message communicating a user's credit account balance of non-negotiable, entertainment credits earned from one or more game providing entities, or the status of the account in relation to the requested purchase amount from GUI 1210. It should be noted that when a user has enough credits to complete the purchase, he or she can be presented with a credit account GUI to choose the type of credits to apply to his or her requested purchase as summarized in GUI 1210.

In this instance, however, a message notifying the user that there are insufficient funds in place can provide a user with three button options (cancel purchase 1222, add other form of payment 1224, or request credit loan 1226). GUI 320 can be rendered by any of a variety of means including, but not limited to, a Web browser, a JAVA applet, a PERL script, and the like. In one embodiment, GUI 320 can be contained within the e-commerce site.

Selection of cancel button 1222 by a user cancels the transaction and can return the user to GUI 1210. Selection of the add other form of payment button 1224 can result in a conventional credit card or PayPal payment GUI being presented to the user to supplement or replace the credit based payment. Selection of the credit loan button 1226 can produce credit advance agreement GUI 1230.

GUI 1230 can be rendered by any of a variety of means including, but not limited to, a Web browser, a JAVA applet, a PERL script, and the like. In one embodiment, GUI 1230 can be contained within the e-commerce site. GUI 1230 contains a means by which the user selects the amount or even type of non-negotiable credits to advance including, but not limited to, a set of radio buttons, a set of checkboxes, a highlighting mechanism, and the like. Display box 1232 can display the monetary value of the selected non-negotiable credits as well as the amount of credits to be advanced for conversion and purchase completion at the e-commerce site. The value displayed in display box 1232 can be based on preset conversion factors.

Selection of cancel button 1234 by a user cancels the credit advance process and can return the user to GUI 1210. Button 1238 can represent the initiation of the process by which the selected non-negotiable credits are advanced and subsequently converted to negotiable and/or entity-independent funds. Selection of button 1238 by a user can be dependent upon a user actively acknowledging terms and conditions 1236 of the requested credit advance and can produce GUI 1240. As such, selection of button 1238 by a user completes the transaction initiated in GUI 1210 and can produce GUI 1240.

E-commerce site 1240 GUI can be a display window from the same said e-commerce site. GUI 1240 can contain a message acknowledging the successful conversion of the user's non-negotiable credits into negotiable and/or entity-independent funds for the purchase of the items in the shopping cart.

Figure 13:
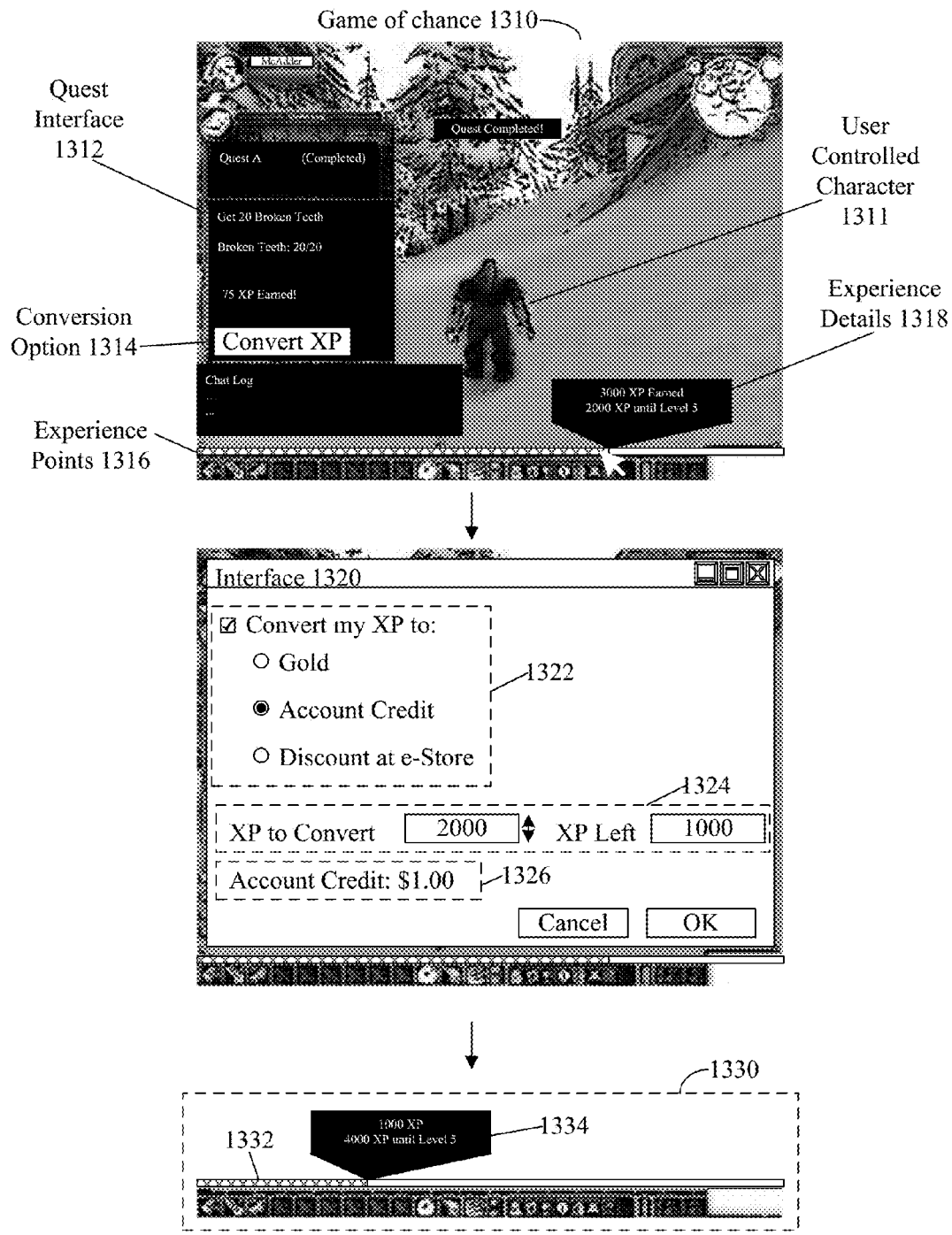
FIG. 13 is a schematic diagram illustrating a set of interfaces within a game of chance for the conversion of non-negotiable credits to negotiable funds in accordance with an embodiment of the inventive arrangements disclosed herein.

FIG. 13 is a schematic diagram illustrating a set of interfaces 1300 within a game of chance for the conversion of non-negotiable credits to negotiable and/or entity-independent funds in accordance with an embodiment of the inventive arrangements disclosed herein. In interfaces 1300, a user controlled character 1311 within a game of chance 1310 can be utilized to earn entertainment credits (e.g., experience points 1316) by interacting with a virtual world of the game of chance 1310. Experience points 1316 can be automatically converted within game 1310 using interface 1320. The result of the conversion can produce negotiable credits (e.g., a user account credit 1326) which can be used by the user in one or more traditional ways. For example, the conversion can be used by the user to supplement a payment of an online subscription to game 1310. In one instance, game 1310 can be a massively multiplayer online role-playing game (MMORPG). For example, the game of chance 1310 can be an MMORPG game.

Experience points 1316 can be earned by interacting with entities within the game of chance 1310 where interactions are governed in part by a randomization component. For example, character 1311 can perform combat with a computer controlled opponent which can respond to user controlled character actions by the use of a random action algorithm to perform appropriate reactions. In one embodiment, game 1310 can encompass one or more randomization elements which can include, but is not limited to, combat interaction, loot generation, non-playable character (NPC) interactions, and the like. It should be appreciated that game 1310 can be highly dynamic and randomized environment which can support single-player mode and/or multiplayer mode.

In game of chance 1310, a character 1311 can be utilized by a user to complete an objective (e.g., Quest A). In one instance, objective completion can be presented quest interface 1312 permitting visual confirmation of the objective. In the instance, interface 1312 can include a conversion option 1314 which can permit the conversion of experience points 1316 to a user selectable option. For example, conversion option 1314 can be a user interactive button which can trigger the presentation of interface 1320. Experience details 1318 can be utilized to present information about total experience points earned during character's existence. Details 1318 can provide pertinent experience point information when a cursor is placed over experience point 1316 presentation (e.g., XP bar). For example, experience points 1316 can be presented as a horizontal bar within game 1310 interface. In one instance, experience details 1318 can be customized to present conversion information about a user defined goal. In the instance, a user can specify negotiable fund goals (e.g., monetary sums), entertainment credit goals (e.g., gold pieces), and the like. For example, details 1318 can present the amount of experience points required to reach a ten dollar conversion.

Upon selection of conversion option 1314, interface 1320 can be presented within game 1310. Interface 1320 can include conversion options 1322, configuration options 1324, and conversion information 1326. Conversion options 1322 can include, but is not limited to, conversion of experience points 1316 into virtual currency, account credit, discounts at e-commerce sites, dragon kill points (DKP), and the like. In configuration options 1324, a user specified quantity of experience points can be converted to selection option 1322. For example, a user can choose to convert two thousand experience points to an account credit. In conversion information 1326, information about conversion outcome for experience points can be presented. In one instance, information can present a quantity of negotiable and/or entity-independent funds to be received, conversion rate details, and the like. It should be appreciated that conversion rates can be dynamic and or constant. In one embodiment, conversion rates can be tied to game 1310 economy permitting economic state to dictate conversion rates.

In one embodiment, conversion of experience points can negatively affect character development. In the embodiment, a quantity of experience points can be deducted from the character based on the configuration options 1324 specified by user. For example, if a user selects to convert two thousand experience points into a one dollar account credit the character 1311 can be reduced to one thousand experience points from three thousand experience points. It should be appreciated that experience points can be continually gained and lost through game 1310 interaction and conversion options 1314.

In section 1330, a portion of game 1310 interface can be presented displaying the outcome of the conversion. In section 1330, experience details can be presented in a tooltip 1334 which can indicate the current experience points of the character 1311 resulting from the conversion. For example, experience points 1322 can be a shortened horizontal bar indicating the portion of the level which the character 1311 has achieved.

Drawings presented herein are for illustrative purposes only and should not be construed to limit the invention in any regard. It should be appreciated that the disclosure is not limited to the conversion of experience points within game 1310. It should be appreciated that options 1322 can be mutually exclusive, combinatorial and the like. For example, a user can convert experience points into a sum of gold pieces and an ecommerce store credit. It should be understood that the functionality described within interfaces 1300 can be performed by a plug-in, Web-enabled service, 13rd-party tools, and the like. For example, interface 1320 can be a screen of an add-on software. It should be appreciated that conversion functionality can be performed by a conversion agency intermediary independent of game 1310 provider.

Figure 14:
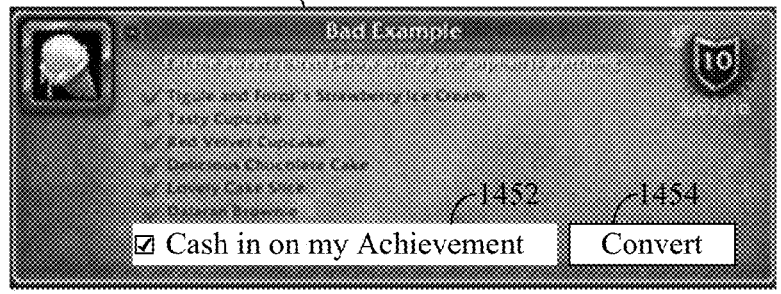
FIG. 14 is a schematic diagram illustrating a set of interfaces within a game of chance for the conversion of non-negotiable credits to negotiable funds in accordance with an embodiment of the inventive arrangements disclosed herein
Figure 14:
Figure 14:
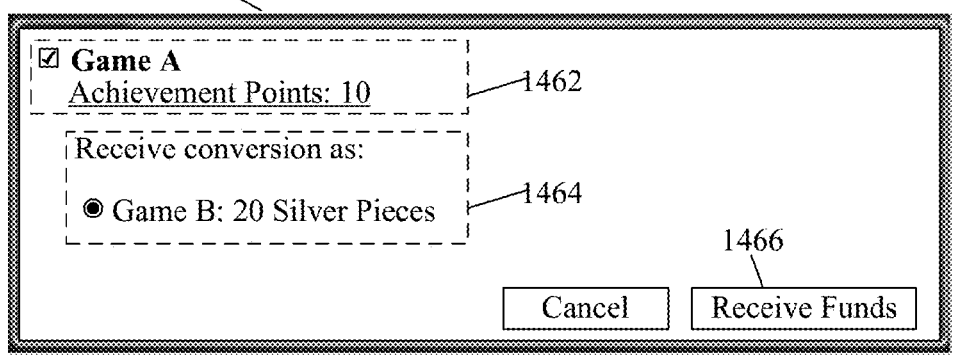

FIG. 14 is a schematic diagram illustrating a set of interfaces 1400 within a game of chance for the conversion of non-negotiable credits to negotiable and/or entity-independent funds in accordance with an embodiment of the inventive arrangements disclosed herein. In interfaces 1400, entertainment credits obtained from one or more achievements within a game of chance 1450 can be converted to negotiable and/or entity-independent funds which can be utilized in game of chance 1460. For example, an achievement completed in Game A can be converted to gold pieces (e.g., in-game currency) of a Game B. In one embodiment, conversion can be a two step process similar to an import/export procedure. In the embodiment, a user can select to convert achievement points within a Game A to Game B currency. In the embodiment, the conversion can be initiated within interface 1451 of game 1450 and completed within interface 1461 of game 1460. It should be appreciated that the disclosure is not limited in this regard and can include a one stage process.

In game 1450, an interface 1451 can be presented indicating an achievement accomplishment. Interface 1451 can include achievement information, conversion option 1452, conversion element 1454, and the like. Conversion option 1452 can be a user selectable option which can permit conversion of entertainment credits (e.g., achievement points) to be utilized as negotiable credits (e.g., silver pieces) within one or more different games (e.g., Game B, Game C). It should be understood that the conversion can include one or more conversion rates which can be associated with one or more games. For example, if a game has three types of virtual currency, each type can be presented as an option for conversion. It should be appreciated that games can include games from one or more different vendors.

In game of chance 1460, an interface 1461 can present conversion details for receiving negotiable and/or entity-independent funds from entertainment credits. Interface 1461 can include, but is not limited to, game selection 1462, conversion preferences 1464, and the like. For example, pending conversions (e.g., Game A achievement) can be presented within game selection 1462. In conversion preferences 1464, user selectable preferences for receiving funds can be specified. For example, ten achievement points can be converted to a quantity of twenty silver pieces within Game B. In one instance, conversions within FIG. 14B can be performed from a centralized user interface (e.g., conversion interface) which can permit immediate conversion of entertainment credits to negotiable and/or entity-independent funds. Upon selection of element 1466, a user profile associated with Game B can be accredited with funds.

Drawings presented herein are for illustrative purposes only and should not be construed to limit the invention in any regard. It should be appreciated that achievements can include, individual achievements, group based achievements, and the like. For example, achievements can include successful completion of a raid encounter (e.g., killing a boss opponent) or a group quest.

Figure 15:
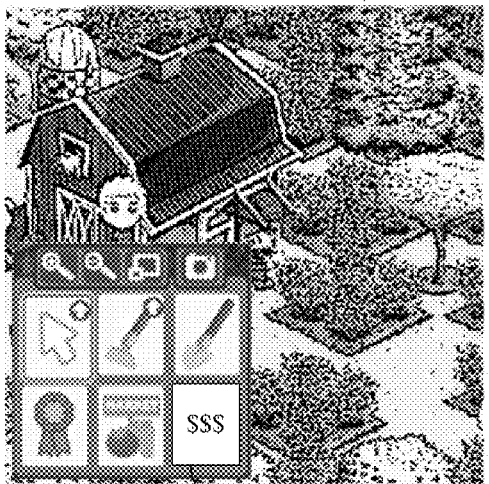
FIG. 15 is a flowchart illustrating a set of embodiments within a game of chance for the conversion of non-negotiable entertainment credits to negotiable funds in accordance with an embodiment of the inventive arrangements disclosed herein.
Figure 15:
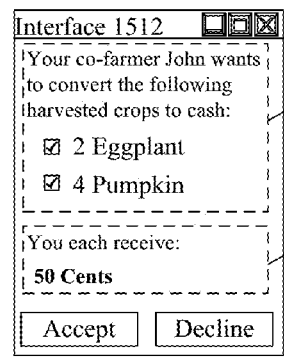
Figure 15:
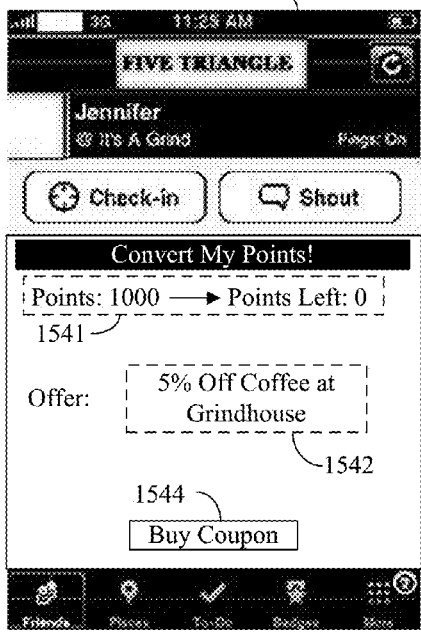
Figure 15:
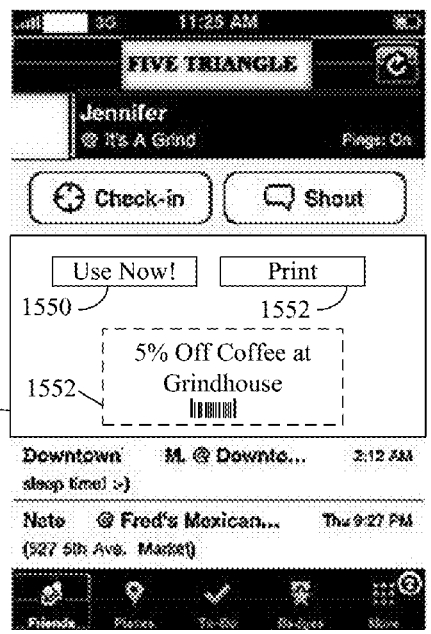

FIG. 15 is a flowchart illustrating a set of embodiments 1500, 1530 within a game of chance for the conversion of non-negotiable entertainment credits to negotiable and/or entity-independent funds in accordance with an embodiment of the inventive arrangements disclosed herein. In embodiment 1500, tool 1512 within game of chance 1510 can permit conversion of entertainment credits (e.g., harvested crops) to negotiable and/or entity-independent funds (e.g., micropayment). In embodiment 1530, interface 1534, 1536 can allow game of chance 1532 earned credits to be converted into vendor specific vouchers.

In game of chance 1510, a tool 1512 can be utilized to convert user generated earnings to negotiable and/or entity-independent funds. In one instance, game 1510 can be a simulation based game permitting earnings to be accrued which can determine user success within the game. For example, game 1510 can be a farming simulation which allows the planting, harvesting, and selling of crops (e.g., at a virtual market in game 1510) to advance the gameplay. It should be appreciated that earnings can include, but is not limited to, virtual currency (e.g., farm coins), experience points, crops, animals, and the like.

In one instance, tool 1512 can trigger the presentation of interface 1512. In the instance, interface 1512 can include, but is not limited to, earned credits 1520 information, converted funds 1522 details, and the like. In one embodiment, game of chance 1510 can be a multiplayer game (e.g., co-operative gameplay) associated with an online social network framework. For example, game 1510 can be a social networking game. It should be appreciated that game 1510 outcome can be affected by one or more random variables including, multiplayer interaction, virtual economy state, and the like. In interface 1512, user selectable credits 1520 can be chosen to be converted into funds 1522. In one instance, interface 1512 can be an interface able to support co-operative gameplay. In the instance, interface 1512 can be presented in response to a co-operative user action within a second user interface of game 1510. For example, a second user (e.g., John) can initiate a conversion action which can convert harvested crops into fifty cents upon approval by the first user. That is, interface 1512 can be a mechanism for co-operative gameplay with conversion capabilities. It should be appreciated that interface 1512 can include capabilities which support other co-operative gameplay including, but not limited to, trading, group-based objectives, and the like.

In game of chance 1532, points earned from presence registration at a venue associated with a location based service can be converted into a negotiable voucher. Game of chance 1532 can include, but is not limited to, online social network game, location based game, and the like. For example, game of chance 1532 can include geocaching games which can reward points for locating cached objects. In one instance, game 1532 can be associated with a location based social networking Web site. For example, game 1532 can be a mobile application for earning status advancement (e.g., points, badges, titles, etc.) by presence registration (e.g., "check-in") at a venue. It should be appreciated that earnings can be affected by one or more random variables including, user-to-user interactions, venue promotions, and the like.

In interface 1534, conversion of earned points (e.g., from "check-ins") can be performed utilizing conversion artifact 1544. Interface 1534 can include, but is not limited to, earnings information 1541, conversion option 1542, conversion artifact 1544, and the like. For example, interface 1534 can present the points earned by a user (e.g., 1000 points), a conversion option (e.g., coupon information), and a mechanism for initiating conversion (e.g., "Buy Coupon" button). In one instance, interface 1534 can be presented when a quantity of earning is reached. For example, when a user reaches one thousand points, the interface 1534 can be automatically presented upon check-in. In another instance, interface 1534 can be manually selected from a set of conversion options associated with the game of chance 1532. In one embodiment, conversion option 1542 can be a voucher for a venue associated with a previous presence registration. For example, a discount (e.g., option 1542) can be selected based on one or more places the user has visited in the past thirty days.

Upon conversion initiation via conversion artifact 1544, conversion 1540 can be performed. Interface 1536 can be presented responsive to the conversion 1540. In interface 1536, a coupon 1552 can be presented which can be utilized by a user as a negotiable entity. In one instance, coupon 1552 can be automatically and/or manually utilized. For example, coupon 1552 can be automatically added to a user account associated with a venue at which the coupon is redeemable. In one embodiment, interface 1536 can present electronic and non-electronic options for coupon redemption. In the embodiment, an electronic redemption button 1550 can permit the presentation of coupon 1552 which can be communicated to proximate electronic devices. For example, "Use Now!" button 1550 can present coupon 1552 with barcode (e.g., linear, QR) which can be scanned at a register to provide a discount at checkout (e.g. upon item purchase). In the embodiment, interface 1552 can permit a hardcopy of the coupon 1552 to be created which can be utilized as a traditional coupon.

FIG. 16A is a flowchart showing a simplistic depiction of a loyalty program. The most basic elements are that loyalty programs require memberships, where members can earn points in that member's account. The points can be used to purchase rewards offered by the loyalty program.

FIG. 16B shows embodiments of the present disclosure that include material limitations to create a bridge between two different loyalty programs with their own program specific boundaries.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

This invention may be embodied in other forms without departing from the spirit or essential attributes thereof. Accordingly, reference should be made to the following claims, rather than to the foregoing specification, as indicating the scope of the invention. As used in the claims herein (consistent with the specification as interpreted by one of ordinary skill) claimed terms are to be interpreted as follows (that is, all claim construction of the following claims are to be construed consistent with the below term definitions—so any ambiguity in the specification that includes multiple embodiments is to be resolved consistent with the below when interpreting the claims in light of the specification). With regard to the loyalty program (where the entity is the loyalty program operator) and the different loyalty program (where the commerce partner is the loyalty program operator) value of the loyalty program points is secured (or backed) by the respective loyalty program operator. That is, loyalty program points (of the loyalty program) and different loyalty program points (of the different loyalty program) are non-negotiable units of value, where the loyalty program operator guarantees or creates whatever value is attributed to these issued points. The loyalty program operator exclusively originates the loyalty program points. The loyalty program operator may (or may not) sell these originated points on an open market (for a program operator defined cost), the loyalty program operator may (or may not) sell groups of points that it originated (created from nothing) to other merchants to distribute to customers. The value of the loyalty program points is subject to unilateral change by the loyalty program operator (although contract law and agreement made with merchants and/or consumers may legally impose constraints upon these unilateral changes—otherwise the control of value is possessed by the loyalty program operator. If the loyalty program operator goes bankrupt, the value of issued points is subject to bankruptcy determinations. Additionally, in absence of self-imposed or contractually agreed upon terms, the loyalty program operator can change the valuation of issued points by fiat, which affects holders of these loyally program operator backed points). Terms of the loyalty programs operated by loyalty program operators (both the entity and the commerce partner are loyalty program operators) are established by the loyalty program operator. These terms do impose a membership requirement in order to accumulate, maintain, or redeem the points granted per terms of the respective programs. Program members possess program specific accounts, within which membership points are accrued. The accounts are stored in non-transitory storage mediums controlled (whether physically owned by the program operator or provided as a computing service by a third party) by the program operator per terms of the respective program. The terms of the programs (both the loyalty program and the different loyalty program) impose membership conditions, impose redemption restrictions, and impose transfer restrictions on the program points held in the program accounts. The loyalty program operators (both commerce partner and entity for their respective programs) utilizes the value of loyalty program points held in the accounts, utilizes the membership conditions, utilizes the redemption restrictions, and utilizes the transfer restrictions to shape future commerce actions of members of the programs in a manner beneficial to the program operator such that commerce activities (unrelated to the running of the programs) between a program operator and members increases (statistically, where individual members may not necessarily increase but in aggregate statistics averaged across members expresses the increases) net revenue from the members for the future commerce actions (unrelated to the loyalty program itself, but influenced by the loyalty program that shapes member behavior with rewards/constraints) between the members and the program operator when statistically compared to anticipated future net revenue from a similarly positioned non-members. Further, as used herein, the entity and the commerce partner are different legal entities and are not parent or subsidiary entities of each other. Conversions of loyalty program points (of the entity's program) to different program points (of the commerce partner's program) is explicitly permitted by terms of a mutual agreement established between the entity and the commerce partner. The mutual agreement is differentiated from other open market entities based at least in part on the commerce-based relationship between the entity and the commerce partner. In other words, the commerce partner has a business-related relationship with the entity that provides a synergy significant in shaping consumer behavior in a desired manner as defined by the loyalty program operator. (Once such synergy is between airlines and hotel partners as airline commercial activities and hotel commerce activities are market complements. Negative commerce based relationships <like substitute goods, where the relationship is that of a competitor> can be disfavored by not including them in a contract, or by making contract terms result in high value loss per transaction). The mutual agreement establishes an agreed upon ratio for converting loyalty points to different loyalty program points and establishes a compensation amount to be paid by the entity to the commerce partner on a per-point basis for conversions of member points between programs.

The claims as presented herein are intentionally constrained in scope and breadth to include only patent eligible subject matter. Any embodiments of the disclosed invention as claimed determined to be non-patent eligible under 35 USC 101 (or determined to be exceeding permitted bounds of patently of allowable subject matter based on any judicially created doctrines, or based upon any statute) are explicitly disclaimed herein. The claims presented herein are to be construed as being limited in scope to include only a process, a machine, a manufacture, and/or a composition of matter as legally defined to be patent eligible per application of 35 USC 101, and the claims are explicitly to be construed as excluding any embodiments falling outside the patent eligible bounds defined by 35 USC 101. Any interpretation of claimed subject matter resulting in coverage of non-patentable abstract ideas (under rules based on 35 USC 101) are expressly disclaimed herein. For clarity of doubt, per claim construction (interpreting the claims in the broadest reasonable fashion in light of the specification) this specification explicitly restricts the scope of the claimed subject matter to include only embodiments of the claimed subject matter deemed to be patent eligible per application of 35 USC 101. Given the above expressed disclaimer of any embodiments exceeding this scope, any interpretation of the claims that includes subject matter exceeding this expressly defined scope are to be considered unreasonable and overly broad interpretations of the claims (as the claims are interpreted in their broadest reasonable manner in light of the specification).

What is claimed is:

1. A method comprising:

a computer, comprising hardware and software, converting a first quantity of loyalty program points of a loyalty program possessed by a member held in a first account to a second quantity of different loyalty program points possessed by the member held in a second account in accordance with a fixed ratio, wherein the loyalty program points and the different loyalty program points are non-fungible, non-negotiable units of exchange, wherein the loyalty program is a loyalty program of an entity, wherein value of the loyalty program points is secured by the entity that exclusively originates the loyalty program points, wherein the value of the loyalty program points is subject to unilateral change by the entity, wherein terms of the loyalty program are established by the entity, wherein terms of the loyalty program imposes a membership requirement in order to accumulate, maintain, or redeem the loyalty points, wherein the member is a member of the loyalty program per the terms of the loyalty program and wherein the first account is an account of the loyalty program, wherein information of the first account is stored in a non-transitory storage medium controlled by the entity per terms of the loyalty program, wherein terms of the loyalty program impose membership conditions, impose redemption restrictions on loyalty points held in the first account, and impose transfer restrictions on the loyalty program points held in the first account, wherein the loyalty program utilizes the value of loyalty program points held in the first account, the membership conditions, the redemption restrictions, and the transfer restrictions to shape future commerce actions of the member in a manner beneficial to the entity such that the entity increases net revenue from the member for the future commerce actions when statistically compared to anticipated future net revenue from a similarly positioned non-member;

wherein the different loyalty program is a loyalty program of a commerce partner having a commerce-based relationship with the entity, wherein value of the different loyalty program points is secured by the commerce partner that exclusively originates the different loyalty program points, wherein the value of the different loyalty program points is subject to unilateral change by the commerce partner, wherein terms of the different loyalty program are established by the commerce partner, wherein terms of the different loyalty program imposes a membership requirement in order to accumulate, maintain, or redeem the different loyalty points, wherein the member is a member of the different loyalty program per the terms of the different loyalty program and wherein the second account is an account of the different loyalty program, wherein information of the second account is stored in a non-transitory storage medium controlled by the commerce partner per terms of the different loyalty program, wherein terms of the different loyalty program impose membership conditions, impose redemption restrictions on different loyalty points held in the second account, and impose transfer restrictions on the loyalty program points held in the second account, wherein the different loyalty program utilizes the value of different loyalty program points held in the second account, the membership conditions of the different loyalty program, the redemption restrictions of the different loyalty program, and the transfer restrictions of the different loyalty program to shape future commerce actions of the member in a manner beneficial to the commerce partner such that the commerce partner increases net revenue from the member for the future commerce actions when statistically compared to anticipated future net revenue from a similarly positioned non-member;

wherein the entity and the commerce partner are different legal entities and are not parent or subsidiary entities of each other, wherein the converting is explicitly permitted by terms of a mutual agreement established between the entity and the commerce partner, wherein the mutual agreement is differentiated from other open market entities based at least in part on the commerce-based relationship between the entity and the commerce partner, wherein the mutual agreement establishes the fixed ratio for converting loyalty points to different loyalty program points and establishes a compensation amount to be paid by the entity to the commerce partner on a per-point basis for conversions of member points between programs; and responsive to the converting:
   (i) subtracting the first quantity of loyalty program points from the first account;
   (ii) adding the second quantity of different loyalty program points to the second account; and
   (iii) the entity compensating the commerce partner in accordance with the compensation amount based on the mutual agreement.

2. The method of claim 1, wherein the mutual agreement further establishes the fixed ratio for converting different loyalty points to loyalty program points and establishes a compensation amount to be paid by the commerce partner to the entity on a per-point basis for conversions of member points between programs.

3. The method of claim 1, wherein the computer is a special purpose computer comprising hardware and software for controlling and maintaining a plurality of accounts, including the first account, of the loyalty program, wherein the computer is controlled by the entity, wherein the computer performs at least the subtracting of the first quantity, wherein the computer initiates the adding of the second quantity and the compensating of the commerce partner.

4. The method of claim 1, wherein the computer is a special purpose computer comprising hardware and software for manipulating value of the first account and of the second account, wherein the computer is not controlled by the entity or by the commerce partner but is controlled by an independent party from either, wherein the computer initiates the adding, the subtracting, and the compensating.

5. The method of claim 1, wherein the computer is a special purpose computer comprising hardware and software for controlling and maintaining a plurality of accounts, including the second account, of the second loyalty program, wherein the computer is controlled by the commerce partner, wherein the computer performs at least the adding of the second quantity, wherein the computer initiates the subtracting of the second quantity and the compensating from the entity to the commerce partner.

6. The method of claim 1, wherein the converting performs a transformation that changes the first quantity of loyalty points in the first account into the second quantity of different loyalty points in the second account, wherein the transformation changes a physical medium utilized to store respective value from that used for the first account to that used for the second account, wherein the transformation further changes a state of a thing being transformed as transformation necessarily triggers accounting and tax events for both the entity and the commerce partner as values in the first account and in the second account are altered, wherein before the transformation, an inherent property of the first quantity of the loyalty program points did not permit the member to purchase goods/services that the commerce partner provides due to redemption restrictions imposed by the terms of the first loyalty program, wherein after the transformation an inherent property of the second quantity of the different loyalty program points of the second account permits the member to purchase the goods/services that the commerce partner provides by expending the second quantity of the different loyalty program points of the second account, wherein after the transformation, the second quantity of different loyalty program points in the second account are not subject to terms, conditions, or restrictions of the loyalty program, but are instead subject to those of the different loyalty program controlled by the commerce partner.

7. The method of claim 1, wherein the converting, the subtracting, and the adding occur during a single human-to-machine interaction session.

8. A method comprising:

a computer serving a set of one or more Web pages for a loyalty program of an entity to one or more remotely located client machines, wherein the Web pages are able to be rendered within a client-side browser as a graphical user interface on the one or more client machines, wherein upon being rendered within the client-side browser said graphical user interface shows a quantity of loyalty program points held in a first account for a member of the loyalty program, wherein upon being rendered within the client-side browser the graphical user interface comprises a conversion option to convert a first quantity of the shown loyalty program points into a second quantity of different loyalty program points in accordance with a fixed ratio, wherein the loyalty program points and the different loyalty program points are non-fungible, non-negotiable units of exchange, wherein value of the loyalty program points is secured by the entity that exclusively originates the loyalty program points, wherein the value of the loyalty program points is subject to unilateral change by the entity, wherein terms of the loyalty program are established by the entity, wherein terms of the loyalty program imposes a membership requirement in order to accumulate, maintain, or redeem the loyalty points, wherein the member is a member of the loyalty program per the terms of the loyalty program and wherein the first account is an account of the loyalty program, wherein information of the first account is stored in a non-transitory storage medium controlled by the entity per terms of the loyalty program, wherein terms of the loyalty program impose membership conditions, impose redemption restrictions on loyalty points held in the first account, and impose transfer restrictions on the loyalty program points held in the first account, wherein the loyalty program utilizes the value of loyalty program points held in the first account, the membership conditions, the redemption restrictions, and the transfer restrictions to shape future commerce actions of the member in a manner beneficial to the entity such that the entity increases net revenue from the member for the future commerce actions when statistically compared to anticipated future net revenue from a similarly positioned non-member;

wherein the different loyalty program is a loyalty program of a commerce partner having a commerce-based relationship with the entity, wherein value of the different loyalty program points is secured by the commerce partner that exclusively originates the different loyalty program points, wherein the value of the different loyalty program points is subject to unilateral change by the commerce partner, wherein terms of the different loyalty program are established by the commerce partner, wherein terms of the different loyalty program imposes a membership requirement in order to accumulate, maintain, or redeem the different loyalty points, wherein the member is a member of the different loyalty program per the terms of the different loyalty program and wherein the second account is an account of the different loyalty program, wherein information of the second account is stored in a non-transitory storage medium controlled by the commerce partner per terms of the different loyalty program, wherein terms of the different loyalty program impose membership conditions, impose redemption restrictions on different loyalty points held in the second account, and impose transfer restrictions on the loyalty program points held in the second account, wherein the different loyalty program utilizes the value of different loyalty program points held in the second account, the membership conditions of the different loyalty program, the redemption restrictions of the different loyalty program, and the transfer restrictions of the different loyalty program to shape future commerce actions of the member in a manner beneficial to the commerce partner such that the commerce partner increases net revenue from the member for the future commerce actions when statistically compared to anticipated future net revenue from a similarly positioned non-member;

wherein the entity and the commerce partner are different legal entities and are not parent or subsidiary entities of each other, wherein the converting is explicitly permitted by terms of a mutual agreement established between the entity and the commerce partner, wherein the mutual agreement is differentiated from other open market entities based at least in part on the commerce-based relationship between the entity and the commerce partner, wherein the mutual agreement establishes the fixed ratio for converting loyalty points to different loyalty program points and establishes a compensation amount to be paid by the entity to the commerce partner on a per-point basis for conversions of member points between programs;

the computer responsive to receiving a message indicating a selection of the conversion option, processing the selection to effectuate changes in the served set of Web pages; and responsive to the processing, the computer serving one or more Web pages or Web page updates that include the effectuated changes to the one or more remotely located client machines, wherein upon being rendered within the client-side browser the graphical user interface is updated with the effectuated changes, wherein the updated graphical user interface shows a reduced quantity of loyalty program points held in the first account, said reduced quantity resulting from the first quantity being subtracted from a total quantity of different loyalty program points of the first account in accordance with the fixed ratio, wherein responsive to the processing the entity compensates the commerce partner per the mutual agreement, wherein the serving of the set, the receiving, and the serving of the Web pages or Web page updates that include the effectuated changes occurs during a single human-to-machine interaction session.

9. The method of claim 8, wherein the mutual agreement further establishes the fixed ratio for converting different loyalty points to loyalty program points and establishes a compensation amount to be paid by the commerce partner to the entity on a per-point basis for conversions of member points between programs.

10. The method of claim 8, wherein the computer is a special purpose computer comprising hardware and software for serving Web pages of a Web site accessed via the client-side browser.

11. The method of claim 8, wherein the Web pages served by the computer are Web pages of a Web site controlled by the entity for the loyalty program.

12. The method of claim 8, wherein the Web pages served by the computer are Web pages of a Web site controlled by the commerce partner for the different loyalty program.

13. The method of claim 8, wherein the processing performs a transformation that changes the first quantity of loyalty points in the first account into the second quantity of different loyalty points in the second account, wherein the transformation changes a physical medium utilized to store respective value from that used for the first account to that used for the second account, wherein the transformation further changes a state of a thing being transformed as transformation necessarily triggers accounting and tax events for both the entity and the commerce partner as values in the first account and in the second account are altered, wherein before the transformation, an inherent property of the first quantity of the loyalty program points did not permit the member to purchase goods/services that the commerce partner provides due to redemption restrictions imposed by the terms of the first loyalty program, wherein after the transformation an inherent property of the second quantity of the different loyalty program points of the second account permits the member to purchase the goods/services that the commerce partner provides by expending the second quantity of the different loyalty program points of the second account, wherein after the transformation, the second quantity of different loyalty program points in the second account are not subject to terms, conditions, or restrictions of the loyalty program, but are instead subject to those of the different loyalty program controlled by the commerce partner.

14. The method of claim 8, wherein the updated graphical user interface shows a quantity of different loyalty program points resulting from converting the first quantity of loyalty program points into the second quantity of different loyalty program points in accordance with the fixed ratio of the mutual agreement.

15. A system comprising:
one or more processors;
one or more non-transitory storage mediums comprising program instructions able to execute on the one or more processors, wherein execution of the program instructions by the one or more processors:
converts a first quantity of loyalty program points of a loyalty program possessed by a member held in a first account to a second quantity of different loyalty program points possessed by the member held in a second account in accordance with a fixed ratio, wherein the loyalty program points and the different loyalty program points are non-fungible, non-negotiable units of exchange,
wherein the loyalty program is a loyalty program of an entity, wherein value of the loyalty program points is secured by the entity that exclusively originates the loyalty program points, wherein the value of the loyalty program points is subject to unilateral change by the entity, wherein terms of the loyalty program are established by the entity, wherein terms of the loyalty program imposes a membership requirement in order to accumulate, maintain, or redeem the loyalty points, wherein the member is a member of the loyalty program per the terms of the loyalty program and wherein the first account is an account of the loyalty program, wherein information of the first account is stored in a non-transitory storage medium controlled by the entity per terms of the loyalty program, wherein terms of the loyalty program impose membership conditions, impose redemption restrictions on loyalty points held in the first account, and impose transfer restrictions on the loyalty program points held in the first account, wherein the loyalty program utilizes the value of loyalty program points held in the first account, the membership conditions, the redemption restrictions, and the transfer restrictions to shape future commerce actions of the member in a manner beneficial to the entity such that the entity increases net revenue from the member for the future commerce actions when statistically compared to anticipated future net revenue from a similarly positioned non-member;
wherein the different loyalty program is a loyalty program of a commerce partner having a commerce-based relationship with the entity, wherein value of the different loyalty program points is secured by the commerce partner that exclusively originates the different loyalty program points, wherein the value of the different loyalty program points is subject to unilateral change by the commerce partner, wherein terms of the different loyalty program are established by the commerce partner, wherein terms of the different loyalty program imposes a membership requirement in order to accumulate, maintain, or redeem the different loyalty points, wherein the member is a member of the different loyalty program per the terms of the different loyalty program and wherein the second account is an account of the different loyalty program, wherein information of the second account is stored in a non-transitory storage medium controlled by the commerce partner per terms of the different loyalty program, wherein terms of the different loyalty program impose membership conditions, impose redemption restrictions on different loyalty points held in the second account, and impose transfer restrictions on the loyalty program points held in the second account, wherein the different loyalty program utilizes the value of different loyalty program points held in the second account, the membership conditions of the different loyalty program, the redemption restrictions of the different loyalty program, and the transfer restrictions of the different loyalty program to shape future commerce actions of the member in a manner beneficial to the commerce partner such that the commerce partner increases net revenue from the member for the future commerce actions when statistically compared to anticipated future net revenue from a similarly positioned non-member;
wherein the entity and the commerce partner are different legal entities and are not parent or subsidiary entities of each other, wherein the converting is explicitly permitted by terms of a mutual agreement established between the entity and the commerce partner, wherein the mutual agreement is differentiated from other open market entities based at least in part on the commerce-based relationship between the entity and the commerce partner, wherein the mutual agreement establishes the fixed ratio for converting loyalty points to different loyalty program points and establishes a compensation amount to be paid by the entity to the commerce partner on a per-point basis for conversions of member points between programs; and
responsive to the converting:
(i) subtracts the first quantity of loyalty program points from the first account;
(ii) adds the second quantity of different loyalty program points to the second account; and
(iii) initiates the entity compensating the commerce partner in accordance with the compensation amount based on the mutual agreement.

16. The system of claim 15, wherein the mutual agreement further establishes the fixed ratio for converting different loyalty points to loyalty program points and establishes a compensation amount to be paid by the commerce partner to the entity on a per-point basis for conversions of member points between programs.

17. The method of claim 15, wherein execution of the program instructions that converts the first quantity into the second quantity performs a transformation that changes the first quantity of loyalty points in the first account into the second quantity of different loyalty points in the second account, wherein the transformation changes a physical medium utilized to store respective value from that used for the first account to that used for the second account, wherein the transformation further changes a state of a thing being transformed as transformation necessarily triggers accounting and tax events for both the entity and the commerce partner as values in the first account and in the second account are altered, wherein before the transformation, an inherent property of the first quantity of the loyalty program points did not permit the member to purchase goods/services that the commerce partner provides due to redemption restrictions imposed by the terms of the first loyalty program, wherein after the transformation an inherent property of the second quantity of the different loyalty program points of the second account permits the member to purchase the goods/services that the commerce partner provides by expending the second quantity of the different loyalty program points of the second account, wherein after the transformation, the second quantity of different loyalty program points in the second account are not subject to terms, conditions, or restrictions of the loyalty program, but are instead subject to those of the different loyalty program controlled by the commerce partner.

18. The system of claim 15, wherein execution of the program instructions that converts, subtracts, and adds occur during a single human-to-machine interaction session.

19. The system of claim 15, wherein the program instructions comprise special purpose instructions and/or specialized hardware for serving Web pages of a loyalty program to client-side browsers of members.

20. The system of claim 15, wherein the program instructions comprise special purpose instructions and/or specialized hardware for managing and maintaining the loyalty program.

* * * * *